United States Patent
Hazarika

(10) Patent No.: US 10,387,171 B2
(45) Date of Patent: Aug. 20, 2019

(54) CONFIGURABLE DEVELOPMENT PLATFORM INTEGRATING HETEROGENEOUS PERSISTENCE SYSTEMS

(71) Applicant: PositiveEdge Solutions LLC, Newark, CA (US)

(72) Inventor: Arunabh Hazarika, Fremont, CA (US)

(73) Assignee: POSITIVEEDGE SOLUTIONS LLC, Newark, CA (US)

( * ) Notice: Subject to any disclaimer, the term of this patent is extended or adjusted under 35 U.S.C. 154(b) by 213 days.

(21) Appl. No.: 15/236,432

(22) Filed: Aug. 13, 2016

(65) Prior Publication Data

US 2017/0046135 A1   Feb. 16, 2017

Related U.S. Application Data

(60) Provisional application No. 62/204,657, filed on Aug. 13, 2015.

(51) Int. Cl.

| | |
|---|---|
| G06F 9/44 | (2018.01) |
| G06F 9/451 | (2018.01) |
| G06F 9/54 | (2006.01) |
| G06F 21/62 | (2013.01) |
| G06F 8/38 | (2018.01) |

(52) U.S. Cl.
CPC .............. G06F 9/451 (2018.02); G06F 9/541 (2013.01); G06F 8/38 (2013.01); G06F 21/6236 (2013.01)

(58) Field of Classification Search
CPC ......... G06F 9/54; G06F 21/6236; G06F 9/541
See application file for complete search history.

(56) References Cited

U.S. PATENT DOCUMENTS

| | | | | |
|---|---|---|---|---|
| 9,444,838 | B2 * | 9/2016 | McGloin | H04L 63/1458 |
| 2003/0233401 | A1 | 12/2003 | Dean | |
| 2011/0047204 | A1 * | 2/2011 | Mansoor | G06F 17/30893 709/202 |
| 2012/0042216 | A1 * | 2/2012 | Blubaugh | H04L 63/029 714/48 |
| 2012/0203908 | A1 * | 8/2012 | Beaty | G06F 9/5072 709/226 |

(Continued)

OTHER PUBLICATIONS

International Search Report and Written Opinion for International Application No. PCT/US2016/046947, dated Oct. 24, 016, 11 pgs.

*Primary Examiner* — Wei Y Zhen
*Assistant Examiner* — Brahim Bourzik
(74) *Attorney, Agent, or Firm* — Patent Law Works LLP

(57) ABSTRACT

A system and method for integrating an application with a plurality of persistence systems is described. The system includes a processor; and a memory comprising instructions configured to cause the processor to: receive, from a client, a request for access to an application, the application developed for a first persistent system, the application operational on a platform, the platform providing functionality of the first application for information on the first persistent system and information on a second persistent system; provide, to the client, instructions that when implemented cause a user interface to be dynamically generated in a browser of the client, the user interface for using the application; and provide a data model to translate input from and output to the user interface for use by the application.

18 Claims, 25 Drawing Sheets

(56) References Cited

U.S. PATENT DOCUMENTS

| | | | | |
|---|---|---|---|---|
| 2013/0204849 A1* | 8/2013 | Chacko | ............... | G06F 3/0604 |
| | | | | 707/692 |
| 2014/0229628 A1 | 8/2014 | Mandal | | |
| 2014/0244351 A1 | 8/2014 | Symons | | |
| 2016/0028688 A1* | 1/2016 | Chizhov | ............... | H04L 63/029 |
| | | | | 726/12 |
| 2016/0197926 A1* | 7/2016 | Kranz | ............... | G06F 21/606 |
| | | | | 726/4 |
| 2018/0165469 A1* | 6/2018 | Ks | ............... | G06F 21/6227 |
| 2018/0253727 A1* | 9/2018 | Ortiz | ............... | G06Q 20/405 |
| 2018/0293573 A1* | 10/2018 | Ortiz | ............... | G06Q 20/023 |

* cited by examiner

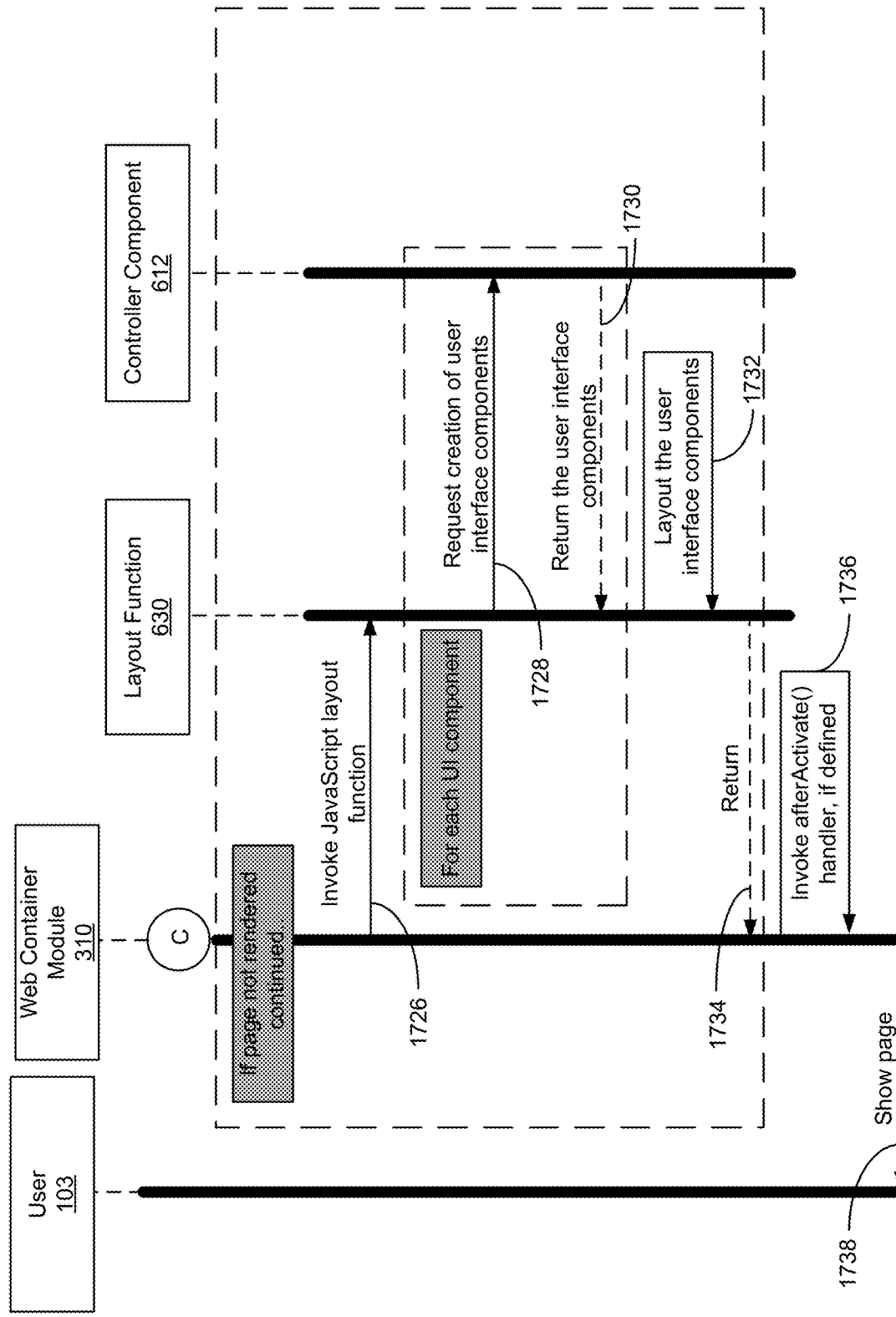

Figure 21

CONFIGURABLE DEVELOPMENT PLATFORM INTEGRATING HETEROGENEOUS PERSISTENCE SYSTEMS

CROSS-REFERENCE TO A RELATED APPLICATION

This application claims the benefit under 35 U.S.C. § 119(e) of U.S. Provisional Patent Application No. 62/204,657, entitled "Keystone Configurable Development Platform Including Configurable Price Quote Application," filed Aug. 13, 2015, the entire content of which is incorporated by reference in its entirety.

BACKGROUND

1. Field of the Invention

The specification generally relates to a system and method for facilitating rapid application development that integrates with multiple persistent systems. In particular, the specification relates to a system and method for simultaneously performing access and operations against multiple, heterogeneous persistence systems within the same application.

2. Description of the Background Art

For many years there have been large enterprise computing systems to run databases and related applications for a variety of functions including accounting, inventory, customer relationship management, etc. These systems are very expensive, required custom coding, and require significant support and infrastructure. In order to address these problems, a number of applications are now being offer on cloud based systems (e.g., a type of Internet-based computing that provides shared computer processing resources and data to computers and other devices on demand) where the cost, support and infrastructure can be distributed over many users making it more accessible for everyone. However, this has created a problem where the needed data is distributed over the different systems, sometimes with some stored at the enterprise while other data is in the cloud. Similarly, there are application that are only operational on the enterprise and not on the cloud, and vice versa. This has led to companies having to duplicate systems and a fracturing of the data and how it can be used.

SUMMARY

The techniques introduced herein overcome the deficiencies and limitations of the prior art, at least in part, with a system and method for simultaneously performing access and operations against multiple, heterogeneous persistence systems within the same application.

According to one aspect of the subject matter described in this disclosure, a system for integrating an application with a plurality of persistence systems, includes a processor; and a memory comprising instructions configured to cause the processor to: receive, from a client, a request for access to an application, the application developed for a first persistent system, the application operational on a platform, the platform providing functionality of the first application for information on the first persistent system and information on a second persistent system; provide, to the client, instructions that when implemented cause a user interface to be dynamically generated in a browser of the client, the user interface for using the application; and provide a data model to translate input from and output to the user interface for use by the application.

In general, another aspect of the subject matter described in this disclosure includes a method that includes receiving, from a client, a request for access to an application, the application developed for a first persistent system, the application operational on a platform, the platform providing functionality of the first application for information on the first persistent system and information on a second persistent system; providing, to the client, instructions that when implemented cause a user interface to be dynamically generated in a browser of the client, the user interface for using the application; and providing a data model to translate input from and output to the user interface for use by the application.

Other implementations of one or more of these aspects include corresponding systems, apparatus, and computer programs, configured to perform the actions of the methods, encoded on computer storage devices.

These and other implementations may each optionally include one or more of the following features. For instance, the first persistent system is an enterprise database and the application is an on-premises third-party application; the second persistent system is a cloud-based system and the application is a cloud-based third-party application; and wherein providing the data model comprises defining an entity class and providing a first mapping to an object of the first persistence system and a second mapping to an object of the second persistence system. Additionally, the system or method may receive a request from the user interface to perform a persistence operation against an object of the first persistence system and an object of the second persistent system; or may associate the entity class with a query and the query is declarative. Additional features may include that the persistence operation is one from the group of create, read, update, delete, bulk save, and bulk delete; that the query adheres to an agnostic schema of the second persistent system; or that the data model includes an agnostic schema for the second persistent system.

BRIEF DESCRIPTION OF THE DRAWINGS

The techniques introduced herein are illustrated by way of example, and not by way of limitation in the figures of the accompanying drawings in which like reference numerals are used to refer to similar elements.

FIGS. 17A-17B are sequence diagrams for generating a user interface, including rendering a page when a user accesses the page for the first time, according to one embodiment of the disclosed technologies.

FIG. 21 is a graphic representation of an embodiment of a user interface illustrating an example page layout and high-level configurable user interface elements.

DETAILED DESCRIPTION

Figure 1:
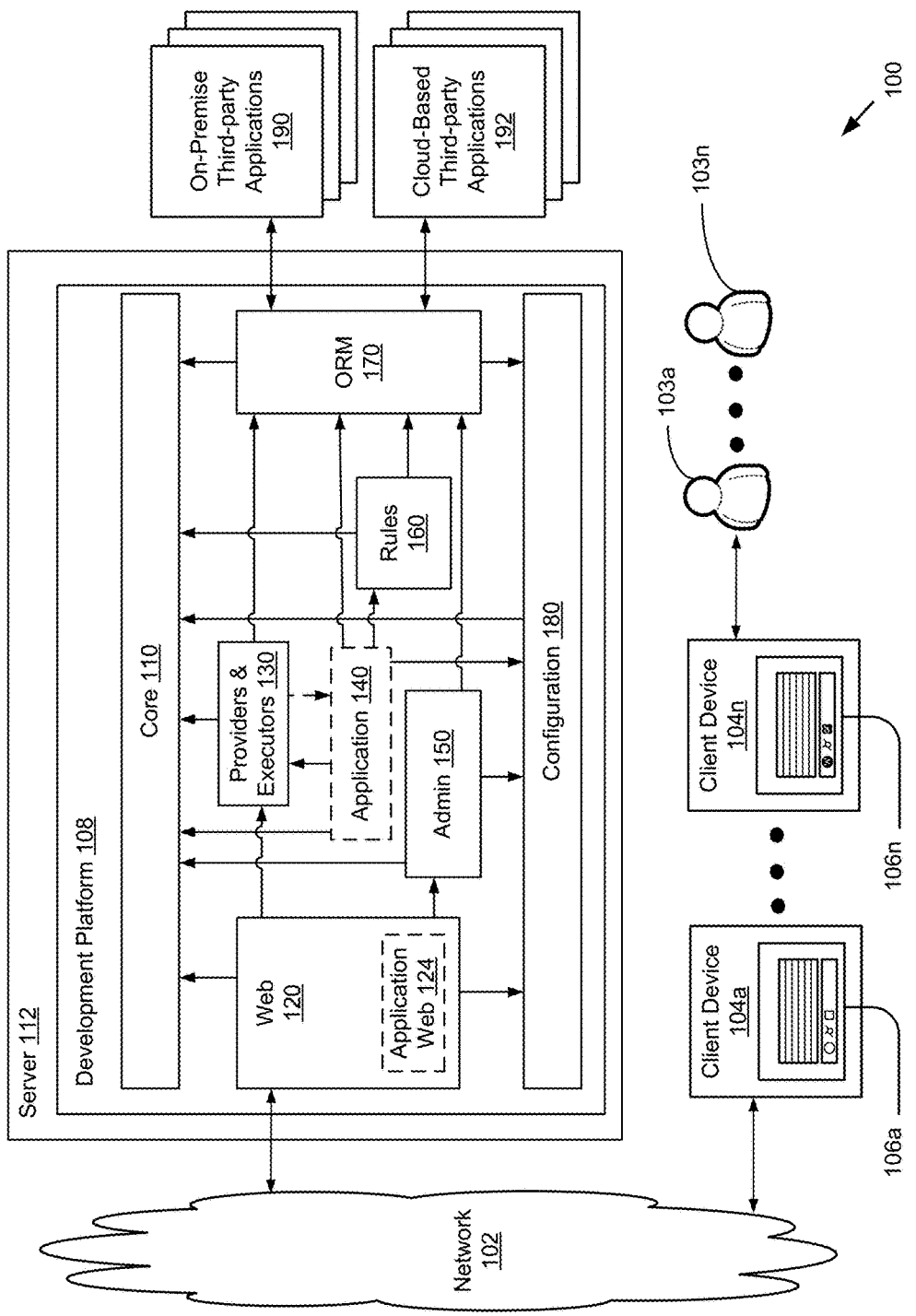
FIG. 1 is a high-level block diagram of an embodiment of an example system including a development platform for integrating with multiple, heterogeneous persistent systems.

The development platform 108 is a configurable development platform intended to facilitate rapid application development that integrates with third-party applications (optionally operating on other systems) 190 and 192, for example Customer Relationship Management (CRM) software such as Microsoft Dynamics CRM and Salesforce. The term persistence system may also be used within this Specification to refer to either of the above mentioned third-party applications/platforms, another third-party application platform, an enterprise database, or a cloud-based application or system. Given a single data model used by development platform 108, virtually no code changes are required to port an application, for example, a Configure, Price, and Quote (CPQ) application, developed for one persistence system, e.g. Salesforce platform, to another heterogeneous persistence system, e.g. Microsoft Dynamics CRM platform, and vice-versa. The development platform 108 provides a well-defined application programming interface (API) with predictable behavior for an application to interact with the development platform, enabling application developers to focus on implementing business functionality instead of focusing on system functionality which is essential to any robust, scalable, performant and secure enterprise web-enabled application.

In one embodiment, development platform 108 includes several components or modules including a Core engine 110, a Web engine 120, Providers and Executors module 130, Administration (Admin) module 150, a Rules engine 160, an Object Relational Mapping engine 170, and a Configuration module 180. The arrows in FIG. 1 indicate the direction of the dependency of the modules and points away from the user of the module. An application deployed on the platform, e.g. enterprise solution Response CPQ, formerly Atlas CPQ application, has two modules shown in dash-outlined boxes, namely Application Provider module 140 and Application Web module 124, which are not a part of the development platform 108. The dependency between the Providers and Executors module 130 and the Application Provider module 140 is bidirectional. Further, calls into the Application Providers module 140—shown as a dotted arrow—are executed via references obtained using reflection, a feature of all modern programming languages. This approach prevents a circular dependency from occurring between the two modules. The Application Web module 124, the second piece of an application deployed on the platform lives within the Web Engine 120. Each of the modules and the services it provides transition from initialization, active and shutdown phases. In the initialization phase, services acquire the resources needed to operate. In the active phase, the service is ready to receive messages and process requests. In the shutdown phase, the services release resources before de-activation.

In one embodiment as shown in FIG. 1, the development platform 108 integrates with both on-premises and online third-party application platforms 190 and 192, e.g. Salesforce platform and MS Dynamic CRM. An application, such as a CPQ business software, hosted on the development platform 108 may be an on-premises or cloud-based application, as well. The term on-premises will herein refer to a type of software delivery model that is installed and operated from a customer's in-house server and computing infrastructure and utilizes an organization's native computing resources. It is one method of using enterprise and consumer applications. The term cloud-based will herein refer to software that is hosted on remote servers where data is sent into "the cloud" over the internet where it is processed and returned to the user and where all application functions are performed off-site or over the internet, not on the user's desktop. In cloud computing, users access software applications remotely through the Internet 102 or other network 102 via a cloud application service provider.

The development platform 108 advantageously provides several unique features including, but not limited to: 1) multiple user authentication options—e.g. standard, SAMLv2 SSO, WS-Federation, Active Directory, One Time Password (OTP), 2) built in XSS and XSRF protection, 3) ability to simultaneously access and operate against multiple, heterogeneous persistence systems within the same application, 4) a declarative query definition mechanism which is syntactically agnostic of underlying persistence system, 5) an identical API for create, read, update, and delete (CRUD) operations, including bulk operations, which are agnostic of the underlying persistence system, 6) a scalable, fast cache for optimized performance, 7) asynchronous execution of long-running tasks, 8) a template-enabled email notification feature, 9) user interface (UI) widgets that map directly to persistence system data types, 10) composite UI components representing HTML forms, tables and trees, and 11) polling for incoming email message events and a processing API for such messages.

FIG. 1 is a high-level block diagram of an embodiment of an example system 100 including a development platform 108 for integrating with multiple, heterogeneous persistent systems (e.g., third-party application platforms) 190 and 192 The term persistent system and third-party application platform are used interchangeably to refer to the systems upon which the third party applications or other applications operate. The system 100 comprises a network 102, a server 112 including the development platform 108, one or more on premise third-party applications 190, one or more cloud-based third-party applications 192, one or more client devices 104a-104n associated with one more users 103a-103n.

The network 102 can be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some embodiments, the network 102 may be a peer-to-peer network. The network 102 may also be coupled to or include portions of a telecommunications network for sending data in a variety of different communication protocols. In some embodiments, the network 102 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 102 coupled to the client devices 104a-104n and the server 112, in practice one or more networks 102 can be connected to these entities.

In one embodiment, the server 112 hosts the development platform 108 and is coupled to the network 102. In some embodiments, the server 112 may be either a hardware server, a software server, or a combination of software and hardware. The server 112 may be may be implemented by a computing device including a processor, a memory, applications, a database, and network communication capabilities. In the example of FIG. 1, the components of the server 112 are configured to implement a development platform 108 described in more detail below. In one embodiment, the server 112 provides instructions for dynamically generating a user interface of an application deployed on development platform 108. The user interface may be used for requesting create, read, update, and delete (CRUD) operations against one or more persistent systems, e.g., third-party application platforms 190 and 192 or for requesting specific business functionality not necessarily associated with a data-set that may be performed by the Action Execution Service Module 662. The server 112 is coupled to the network 102 for communication with the client devices 104a-104n. The server 112 may be coupled to the network 102 for communication with the persistent systems 190, 192 or directly coupled to the persistent systems 190, 192.

The client device 104 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 102. The client device 104 provides general graphics and multimedia processing for any type of application. The client device 104 includes a display for viewing information provided by the development platform 108 of server 112 via a browser 106. While FIG. 1 illustrates two client devices 104a and 104n, the disclosure applies to a system architecture having one or more client devices 104.

The development platform 108 includes several modules or engines for carrying out its functions, including Core engine 110, Web engine 120 including Application Web module 124, Providers and Executors module 130, Application Providers module 140, Administration (Admin) module 150, Rules engine 160, Object-Relational Mapping (ORM) engine 170, and Configuration module 180, each of which will be described in more detail below.

Figure 2:
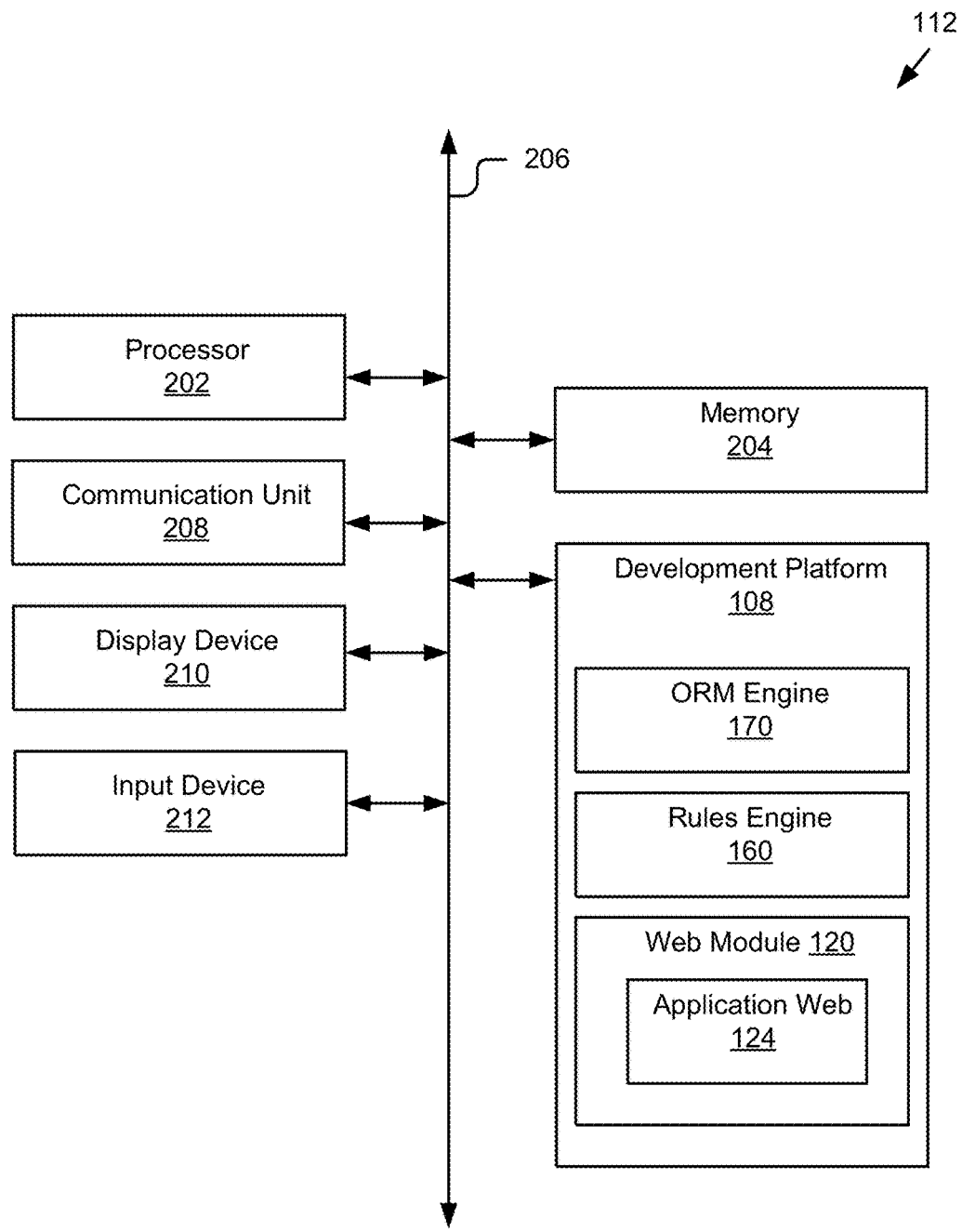
FIG. 2 is a block diagram of an embodiment of a computing device including a development platform for integrating with multiple, heterogeneous persistent systems.

FIG. 2 is a block diagram illustrating one embodiment of a computing device, e.g. server 112 including a development platform 108. The computing device 112 may also include a processor 202, a memory 204, a communication unit 208, a display device 210, and an input device 212 according to some examples. The components of the system 112 are communicatively coupled to a bus or software communication mechanism 206 for communication with each other. In some embodiments, the computing device may be a client device 104, a server 112, or a combination of a client device 104 and a server 112.

The processor 202 comprises an arithmetic logic unit, a microprocessor, a general purpose controller or some other processor array to perform computations, provide electronic display signals to display device 210. The processor 202 is coupled to the bus 206 for communication with the other components of the computing device 112. Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability of the computing device 112 may be limited to supporting the display of images and the capture and transmission of image. The processing capability might be enough to perform more complex tasks, including various types of feature extraction and sampling. It will be obvious to one skilled in the art that other processors, operating systems, sensors, displays and physical configurations are possible. The computing device 112 also includes an operating system executable by the processor such as but not limited to WINDOWS®, Mac OS X, or UNIX® based operating systems.

The memory 204 stores instructions and/or data that may be executed by processor 202. The memory 204 is coupled by the bus 206 for communication with the other components of the computing device 112. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 208 is coupled to the bus 206 and the network 102. An alternate embodiment, the communication unit 208 may provide a port for direct physical connection to the network 102. The communication unit 208 includes a transceiver for sending and receiving instructions and data. In one embodiment, the communication unit 208 includes a Wi-Fi transceiver for wireless communication with an access point. In another embodiment, the communication unit 208 includes a Bluetooth® transceiver for wireless communication with other devices. In yet another embodiment, the communication unit 208 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 208 includes ports for wired connectivity such as but not limited to USB, SD, or CAT-5, etc. The communication unit 208 links the processor 202 to the network 102 that may include multiple processing systems. The network of processing systems may comprise a local area network (LAN), a wide area network (WAN) (e.g., the Internet), and/or any other interconnected data path across which multiple devices may communicate. The communication unit 208 also provides other conventional connections to the network 102 for distribution of files (media objects) using standard network protocols such as TCP/IP, HTTP, HTTPS and SMTP.

The display device 210 is a liquid crystal display (LCD) or any other similarly equipped display device, screen, or monitor. The display device 210 represents any device equipped to display electronic images and data as described herein. In different embodiments, the display is binary (only two different values for pixels), monochrome (multiple shades of one color), or allows multiple colors and shades. In one embodiment, the display device 210 uses reflective light rather than emitting light for use outdoors and uses less power.

The input device 212 is operatively coupled the processor 202 and is any one of a variety of types such as a keyboard and cursor controller, a scanner, a still or video camera, a keypad, a touch screen, a detector, an RFID tag reader, a switch, or any mechanism that allows a user to interact with system 100. In one embodiment, the input device 212 is a keyboard and cursor controller. Cursor control may include, for example, a mouse, a trackball, a stylus, a pen, a touch screen and/or pad, cursor direction keys, or other mechanisms to cause movement of a cursor. In another embodiment, the input device 212 is a microphone, audio add-in/expansion card designed for use within a general purpose computer system, analog-to-digital converters, and digital signal processors to facilitate voice recognition and/or audio processing.

Figure 5:
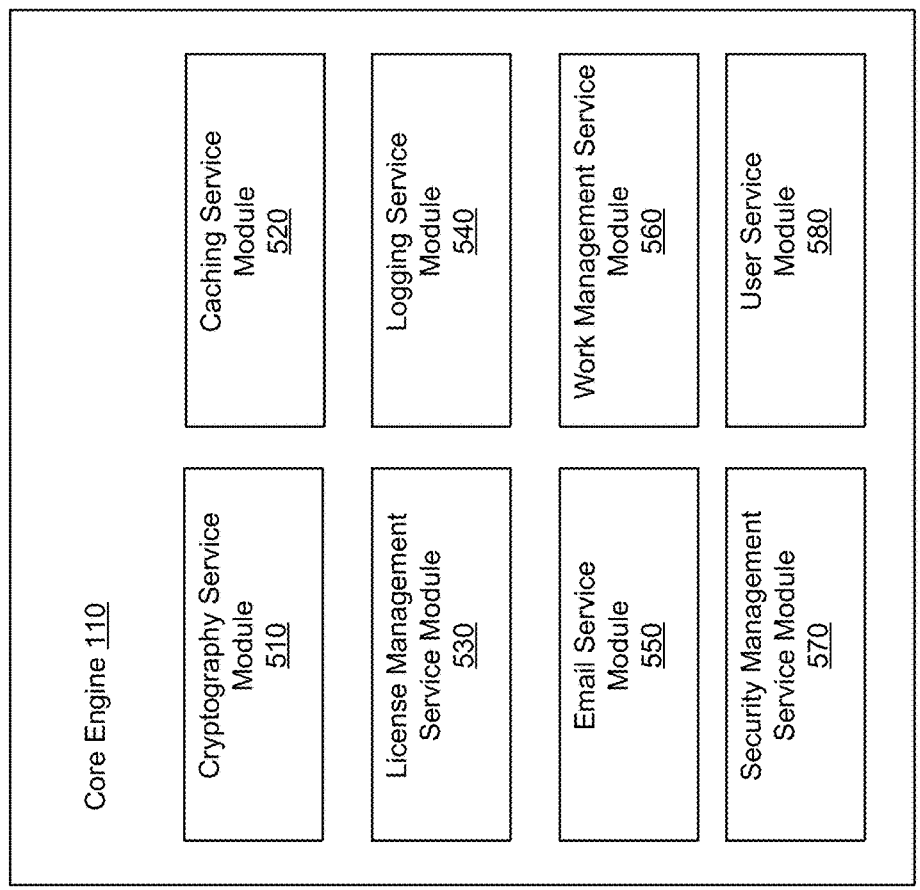
FIG. 5 is a block diagram of an embodiment of a core engine for providing system functionality for the development platform.
Figure 15:
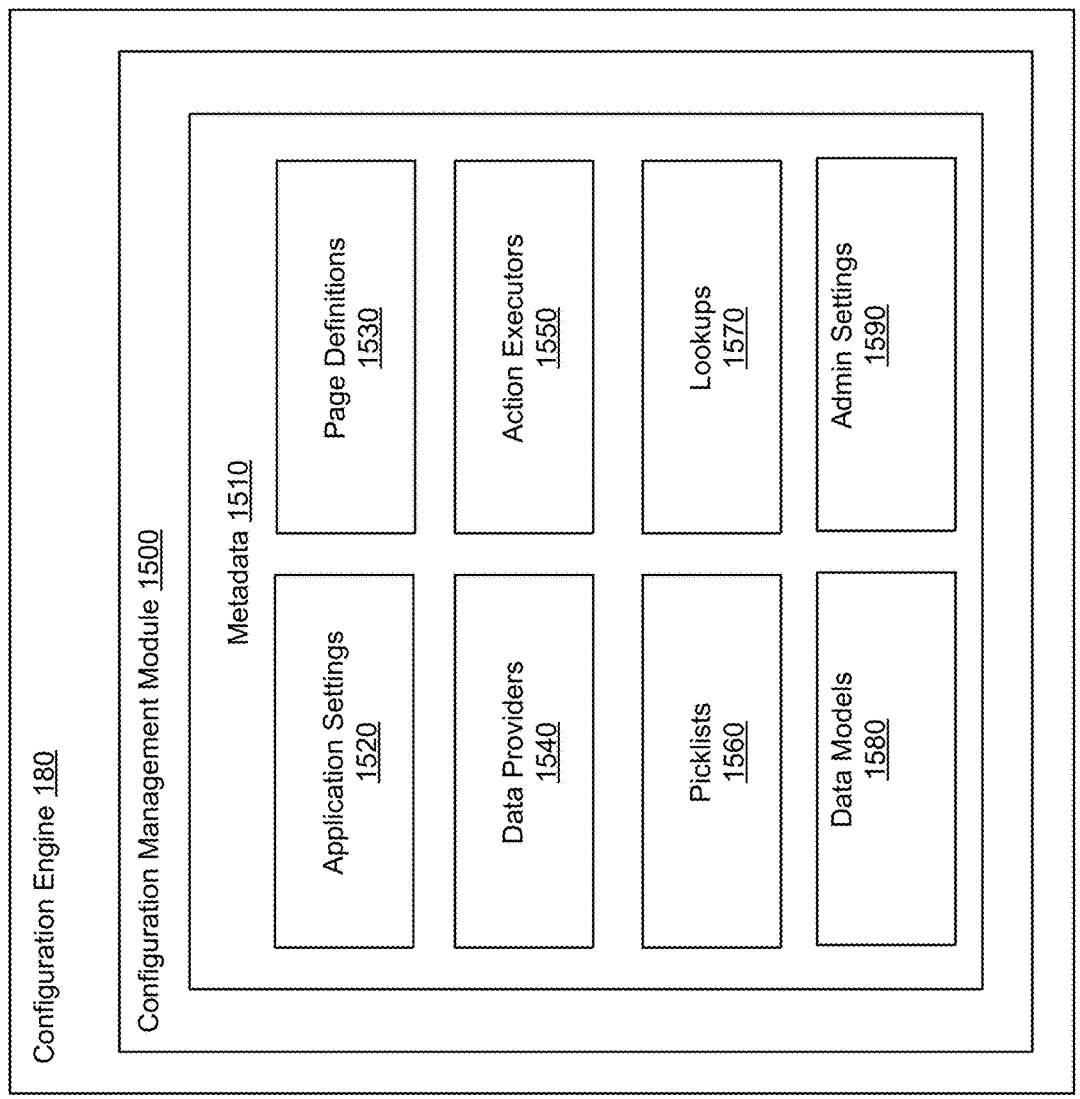
FIG. 15 is a block diagram of an embodiment of a configuration engine for informing the development platform about an application deployed on the development platform, and includes metadata about the application.

Referring now to FIGS. 5 and 15, two components of the platform 108 are described in more detail. FIG. 5 shown an embodiment of the core engine 110 and FIG. 15 shows an embodiment of the configuration engine 180.

FIG. 5 is a block diagram of Core Engine 110 for providing the system functionality of the development platform 108. Core Engine 110 is one of two modules that is used by all other components of development platform 108, as well as applications deployed on the platform 108. The Core Engine 110 includes several modules or components for providing services, including Cryptography Service Module 510, Caching Service Module 520, License Management Service Module 530, Logging Service Module 540, Email Service Module 550, Work Management Service Module 560, Security Management Service Module 570, and User Service Module 580.

Cryptography Service Module 510 provides encryption and decryption of passwords and certain configuration values that may have embedded passwords, e.g. connection strings. It is a singleton with two static methods—Encrypt( ), which takes a raw string and returns a base-64 encoded encrypted string and Decrypt, which takes an encrypted base-64 string and returns the raw string.

Caching Service Module 520 provides high-performance 0(1) cache service for storing frequently used data. Caching Service Module 520 uses a hash map to store keyed information backed by an LRU linked list of entries to pick candidates for eviction when a cache instance reaches capacity. Each instance of the cache also takes a TTL value for cache entries. However, the value is lazily checked—i.e., an entry is only checked for expiration upon access of that entry. Each instance of the cache also accepts a callback object that is notified whenever an entry is removed either because the entry expired or because the cache reached capacity (but not if the entry is intentionally removed). Caching Service Module 520 automatically tracks cache hits and misses to aid performance tuning. The methods provided by this service are:

Object Get(object k)
Set(object k, object v)
Remove(object k)
Integer Accesses( ): The number of times the cache was accessed
Integer Hits( ): The number of times an entry matching the key was found
Integer Size( ): The current number of entries in the cache
The object used as the key must define consistent Equals( ) and Hashcode( ) methods.

License Management Service Module 530 provides services to examine the validity of a license granted to the application deployed on the platform and raises an error if the check fails. License Management Service Module 530 also ensures that an application is deployed to the same DNS name the license was assigned to, and that the current date falls within the license data validity period for every web request received by the platform 108. Further, License Management Service Module 530 ensures that when users are added, the total user count does not exceed the maximum number of users defined by the license.

Logging Service Module 540 provides an asynchronous logging API to minimize the impact of logging on performance. The service automatically rolls over log files upon reaching a size of 2 MB. It includes a singleton with static methods. The Logger maintains a FIFO queue of logging messages passed to one of the Log methods exposed by this service. A message is defined as a single string or a single string and an accompanying Exception or Error object with stack trace. A single background thread reads messages off of the queue and writes the messages to the log file asynchronously. Before each write, the number of bytes written to the log file is checked and if it exceeds the 2 MB limit, the service renames the current log file with an appended timestamp and creates a new file. A single log message does not span multiple log files. The messages provided by this service are:

Init( ): Called during module initialization. At this time, the Logger acquires a handle to the log file and starts the background logging thread.

Log(string m): Adds the message to the logging queue.

Log(string m, Exception e): Adds the message to the logging queue together with an error.

Close( ): Called during module shutdown. The Logger releases the handle to the current log file and terminates the background logging thread.

Email Service Module 550 provides bi-directional communication with a configured email server. Outbound emails (via SMTP) is initialized from configuration parameters provided via the Configuration Module. Such emails are template-based with data filled in by a specific application-specific provider (please see discussion of Providers and Executors 130). Handling inbound email requires an active mailbox on the email server that this service can monitor (only POP3 supported at this time). Users of the service is allowed to register a single callback object with this service that gets notified each time a new email is received. The service leverages the Work Management Service Module 560 to ping the mailbox at periodic intervals. This feature is only activated if a callback object is registered. The service provides the following methods:

SendMail(string tpl, string[ ] to, MailContent data): Send an email using specified template and provided data for the template, to provided set of email addresses.

SendMail(string tpl, string[ ] to, MailContent data, bool async): Same as above, except the email is sent out asynchronously if async is true. This feature leverages the Work Management Service Module 560 to dispatch the email. Composition of the email is performed synchronously.

RegisterCallback(ICallback cbk): Register a callback object to be notified when an email is received.

Work Management Service Module 560 provides a service for allowing applications to run long-running tasks asynchronously. It holds a pool of threads that wait in the suspended state until it is notified of pending work and a FIFO queue onto which users of the service push work. The number of threads in the pool is configurable and provided by the Configuration Module. Upon initialization, the Work Manager Service creates the configured number of threads and adds them to the pool. Upon creation, they immediately go into a wait state on a common monitor. Users of the service push implementations of the IWork interface to the Work Manager. This interface declares a single Process( ) method. Upon receiving the work object, it is pushed to the FIFO queue and the threads are notified. The threads then compete and one of them gets to dequeue the work object and invoke the Process( ) method. Once the Process( ) method returns, the thread returns back to a wait state. To shut down the service, the Work Manager 560 Done( ) method is invoked. This enqueues a special implementation of the IWork instance—one for each thread in the thread pool. Once each thread dequeues this special instance, it shuts down. This allows each thread to complete any pending work before terminating. Methods provided by this service are:

Add(IWork w): To add work to the Work Manager.

Wait( ): Pauses all threads. In-flight work will be completed, but no new work will be dequeued.

Done( ): Shuts down the Work Manager. This method is intended for system use only.

Security Management Service Module 570 provides a service to intercept all requests and verify them for authorized access. Security Management Service Module 570 is installed as an HttpModule. Note: Such a configuration setting is IIS-specific, but all other web servers have an equivalent feature. The service makes the following checks:

Unauthenticated access: If detected the request is redirected to the appropriate login handler.

Unauthorized access: If access to protected or internal access is requested (e.g. the configuration file), access is denied via a 401 HTTP response.

Unauthorized access method: Access to SOAP endpoints via HTTP Gets are disallowed.

Unauthorized access role: Access to the Admin SOAP endpoints are disallowed for users that do not have the Administrator role.

Security Management Service Module 570 also provides XSRF protection by generating a one-time random token generated when a user logs in that is supplied to the Web Module containers (see further description of the Web Engine 120). This token is required to be sent back for every HTTP request either as an HTTP header, a query parameter or as a form value. If the offered token value does not match the one generated for the user, access is denied via a 401 HTTP response.

Figure 6A:
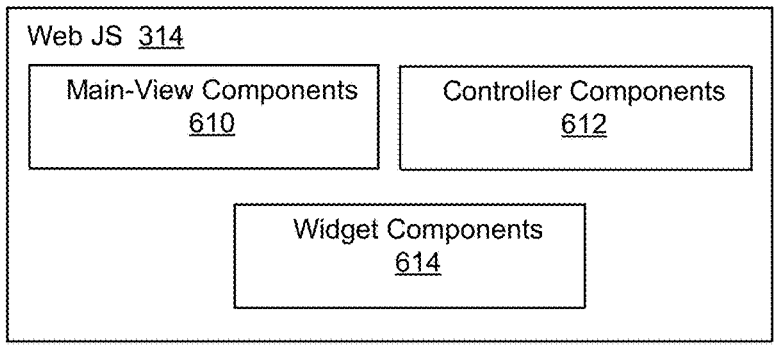
FIGS. 6A-6C are block diagrams of embodiments of components provided by the web engine for generating a user interface for the application deployed by the development platform.
Figure 6B:
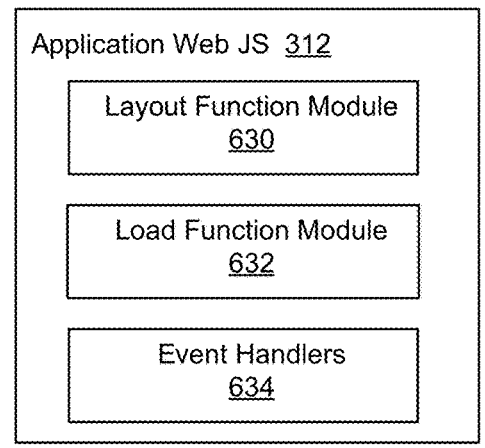
Figure 6C:
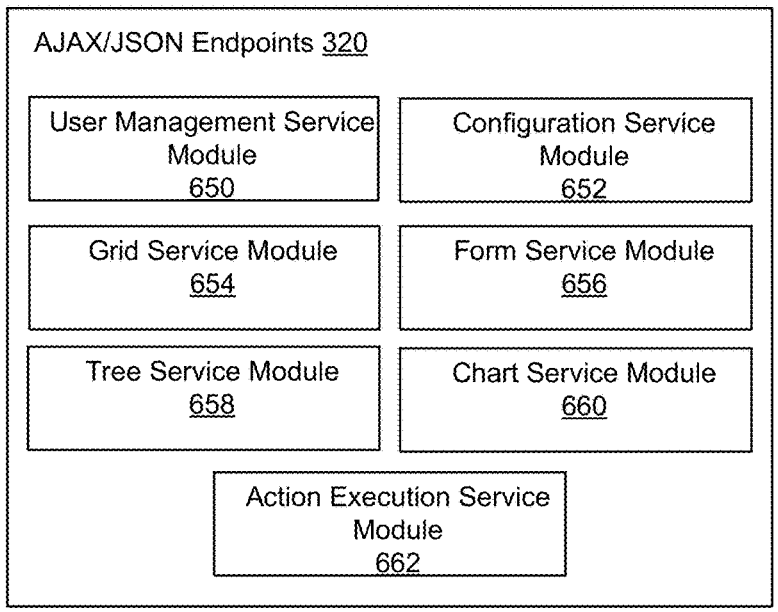

Finally, Security Management Service Module 570 calculates whether a user has the appropriate role to access or perform a particular operation on a particular field or column, a composite UI component or a page (see further description of the Web Engine 120 section for definitions of these terms). Security Management Service Module 570, however, does not automatically detect attempts to access such artifacts—the service must be invoked pro-actively to calculate access. This invocation occurs from the Providers and Executors module 130 and in some cases from the AJAX/JSON Endpoints 320 in FIG. 6C). By default the implementation is open whereby all user roles have read and write access to everything. Each of the artifacts listed above can be protected by defining a permission setting per role in configuration. Depending on the type of artifact, each role may have one of DENIED, UNRESTRICTED or READONLY access types. Artifacts that are not naturally writeable (e.g. composite UI components or toolbar controls) and are, for example, not allowed to have a READONLY access type. The methods this service provides are:

Permission.ACCESS Adjudicate(Permission[ ] permissions): Given a set of permissions attached to a particular artifact, return the type of access—UNRESTRICTED, READONLY, DENIED—granted for the current user's role.

User Service Module 580 provides some pertinent information about the logged in user. These attributes are typically user information stored in the backend persistence system and retrieved and stored in an HTTP Session object after a successful login. The methods provided by this service are:

Euid GetUserPk( ): Returns the primary key for the current user's record.

String GetLoginId( ): Returns the login id for the current user.

String GetUserRole( ): Returns the current user's role.

String GetUserName( ): Returns the full name of the current user.

String GetUserEmail( ): Returns the current user's email address.

FIG. 15 is a block diagram of one embodiment of a configuration engine 180 for informing the development platform 108 about an application deployed on the development platform 108, and includes all of the metadata 1510 about the application. In one embodiment, configuration engine 180 informs the development platform with all of the metadata 1510 about an application deployed on the development platform 108. The configuration engine 180 includes configuration management module 1500 for providing functions for managing and accessing the metadata 1510. This metadata allows the platform to interact with the application as and when necessary. In one embodiment, the configuration may be stored in an XSD schema based XML file that lives within the application web component 124 within the web engine module 120 of the development platform 108. The metadata 1510 includes of the following parts:

Application Settings 1520: The web page application header and footer style, the Work Manager thread pool size, the view class, application toolbar, supported languages (internationalization), application and session initializers.

Figure 21:
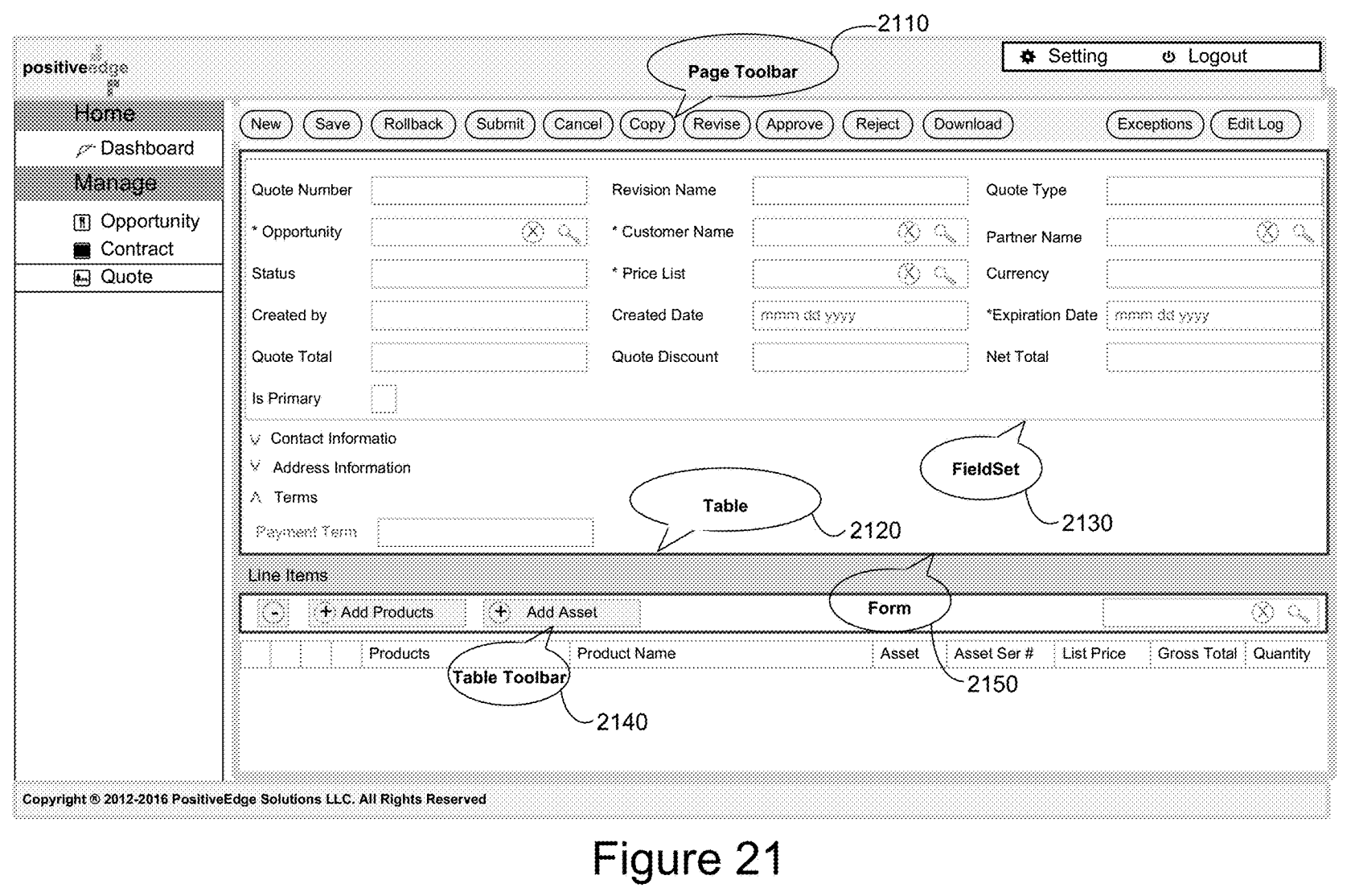
Figure 22:
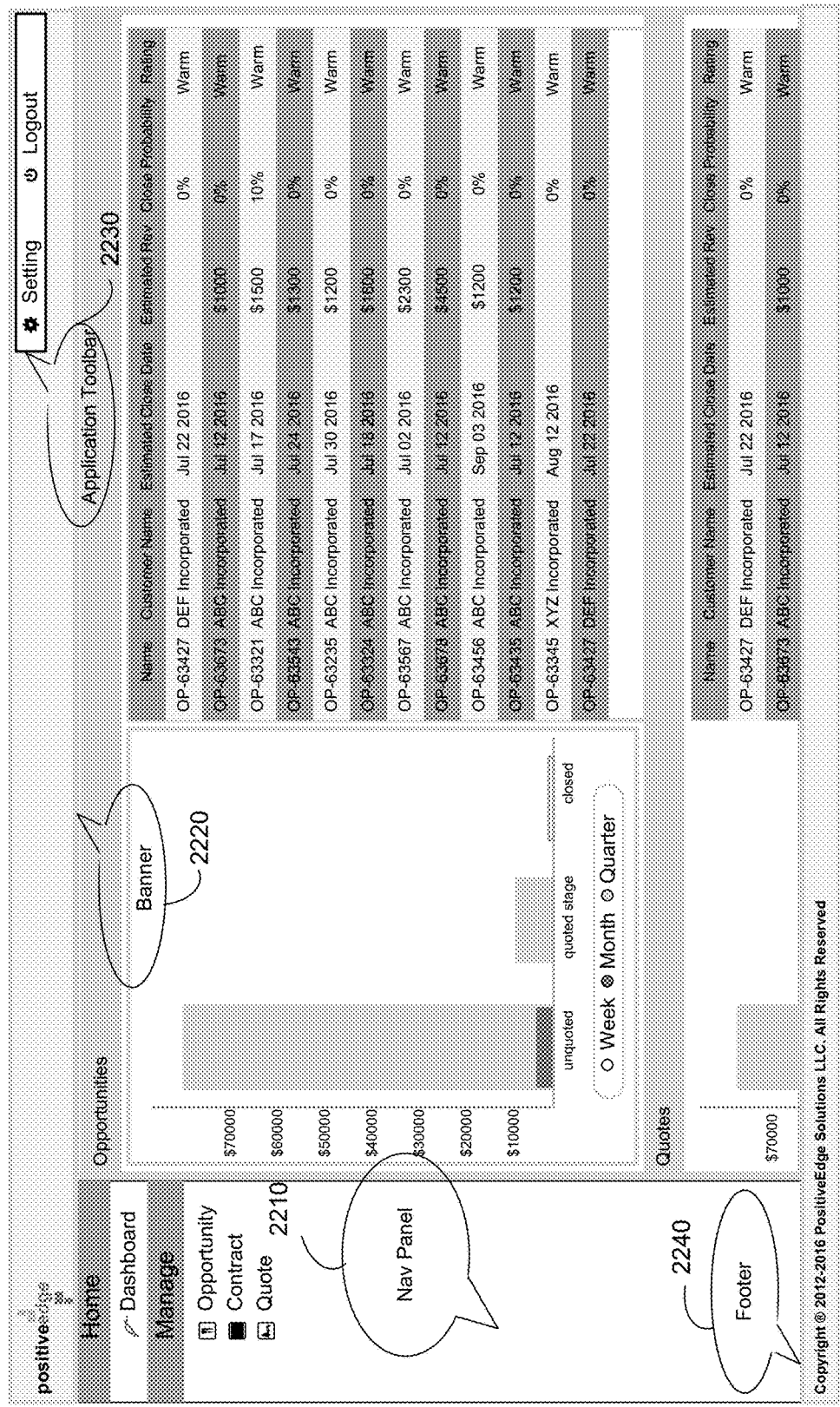
FIG. 22 is a graphic representation of an embodiment of a user interface illustrating an example navigation panel and container level configurable user interface elements.

Page Definitions 1530: Each application deployed on the platform includes a set of pages. Each page includes one more combinations of toolbars, forms, tables and trees, which in turn consist of widgets-fields and columns- and controls-buttons, dropdowns etc. This section defines the composition of each page in the application. See user interfaces of FIGS. 21 and 22 for various UI components such as table 2120, field set 2130 and application toolbar 2230. Each of the composite UI components—forms, tables and trees—is linked to a Data Provider 1540.

Data Providers 1540: This component specifies the classes that implement interfaces defined in the Providers and Executors module 130 and live in the Application Providers module 140.

Picklists 1560: These are definitions of List of Value fields, also called Picklists, one of the field types that may be used in forms and tables. The configuration allows to link these fields directly with fields on the data model in the persistence system. The configuration also allows overriding/replacing or excluding certain values from a particular picklist field.

Lookups 1570: Lookups are another type of fields that represent reference types—a pointer to a specific instance of an entity or a specific record in the data model. This section defines the various types of lookups used in the application.

Data Models 1580: This is where the data models that form the glue between the ORM Engine 170 and the Application Providers module 140 are defined. This section of metadata includes the set of entities that comprise the data model and for each entity, the queries that may be run against it.

Administration (Admin) Settings 1580: The Admin Settings define supported authentication schemes, one or more named persistent systems used by the application and email server configuration.

The Web Engine 120 provides the face of the deployed application to the external world. The Web Engine 120 provides instructions for generating a user interface for an application deployed by development platform 108. The Web Engine 120 hosts web-containers 310—the vehicle on which the pages that comprise the application are delivered to a user's browser 106, among other artifacts. The web engine 120 is the largest module in the platform 108. An application hosted on the platform 108 is a single-page web application when viewed from a client perspective. Containers 310 may host a set of pages, derived from the page definitions 1530 defined in the Configuration Engine 180. There are two containers provided by default—a multi-page container and a single-page container. The multi-page container is intended for access via an independent Universal Resource Locator (URL). In one embodiment a single-page container is intended to be embedded in a third-party web application platform 190 or 192, e.g. Microsoft Dynamics CRM or Salesforce, although a single-page container may be employed for other purposes.

Figure 3:
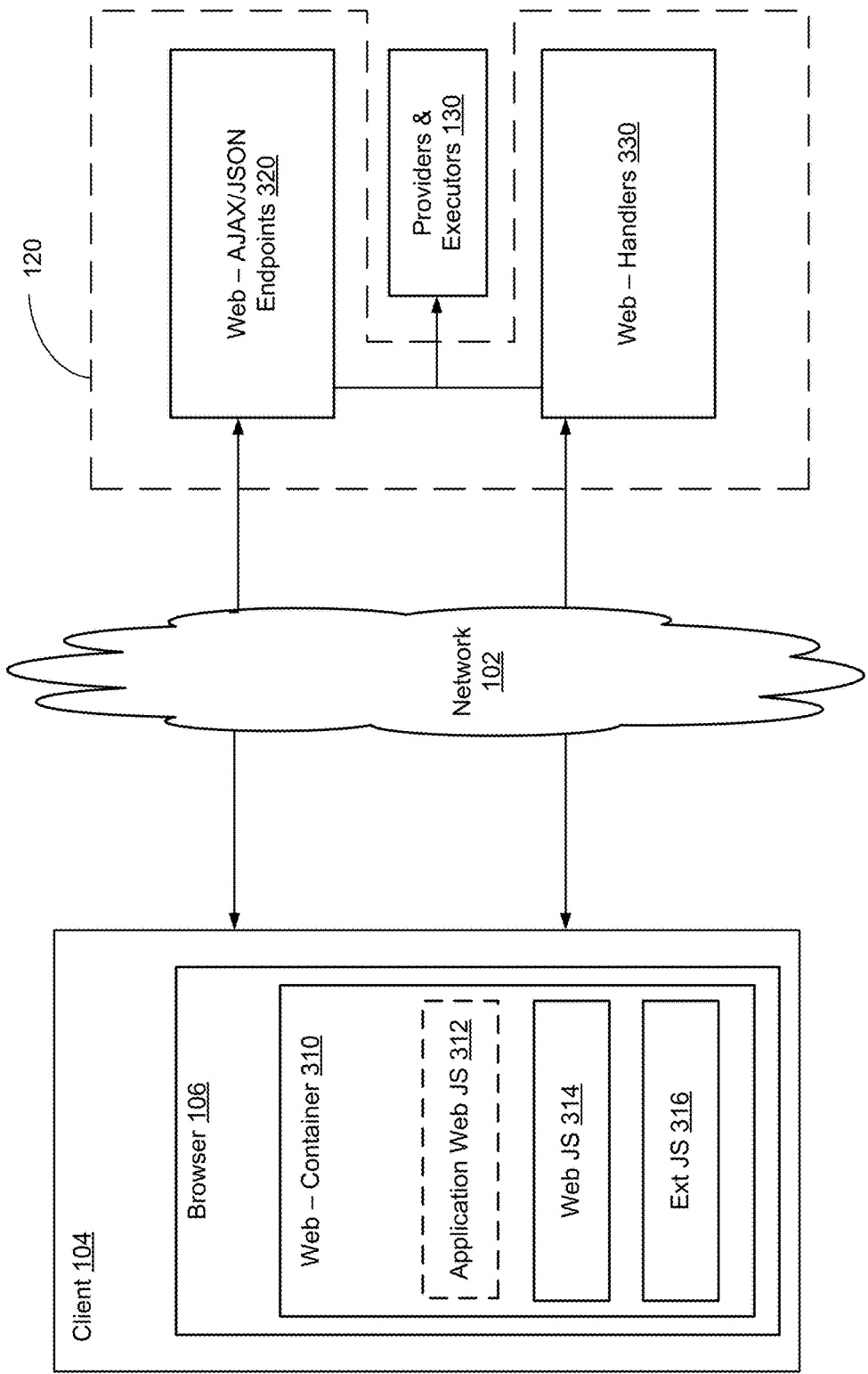
FIG. 3 is a block diagram of an embodiment of components of a web engine for generating a user interface for an application deployed by a development platform.

FIG. 3 is a block diagram of one embodiment of components of web engine 120 for generating a user interface for an application deployed by the development platform 108. The Web Engine 120 provides the instructions for generating a user interface via the browser 106 of the client device 104. The foundation of the user interface (UI) is the third-party Javascript library ExtJS 316. The Web module 120 includes wrappers around this library that exposes a uniform interface to create composite UI components. It also is a bridge between UI events triggered from ExtJS 316 to the Application Web JS event handlers 634. On the server-side, the Web module 120 also provides application-agnostic AJAX/JSON endpoints 320 whose methods represent standard operations that may be performed on a composite UI component—e.g. load, save, update, etc., as well as specific actions that do not necessarily relate to a specific UI component that may be performed by the Action Execution Service Module 662. The Web module 120 interacts with the server-side application implementation, the Application Providers Module 140 via the Providers and Executors Module 130.

User Authentication

In some embodiments, all web requests that arrive at the Web Module 120 go through the Security Management Service module 570 of Core Engine 110. When a request arrives from an unauthenticated user, the Security Management Service module 570 redirects the request to a Login web page. Login checks for the configured authentication scheme with the Configuration Module 180. Depending on the authentication scheme, Login invokes the appropriate method in the Admin Module 150 or re-directs again to an authentication provider if an SSO or similar third-party authentication provider scheme is configured. The authentication options are:

Standard:

This is the default authentication scheme. The user supplies a username and a password and the admin module matches them against stored credentials in the persistence system, i.e. 190 or 192. This scheme may be used in conjunction with the other schemes.

One Time Password (OTP):

In this scheme, an application is allowed to create an OTP record in the persistent system 190, 192. The record is assigned a unique identifier and a one-time password comprising of a set of alpha-numeric characters of any length. A user may request authentication using this scheme by sending two parameters to the Login page on first time access— the requestId and otp=true. Upon validation of the request, the user is challenged for the one-time password. The user is allowed two failed attempts to enter the correct password. If the number of attempts exceed 3, the OTP record is deactivated and cannot be used again and the user is denied access. If the user enters the correct password, the user is allowed access, the OTP record is deactivated and cannot be used again. A TTL or expiration date may also be set for the OTP record. Any attempts to log in, even if the correct one-time password is provided, after the expiration date are denied access. This scheme may be used in conjunction with any of the others.

SAML v2.0:

In this scheme, the Admin module 150 sends out a SAML authentication request to the configured IdP. The response is received by an HTTP handler SSOLogin.ashx.

WS-Federation:

This option is handled entirely by Login page using the open source OWin library from Microsoft.

Auto-Login:

This is the same as Active Directory authentication. Login page invokes the Admin module 150 to handle this.

Microsoft Live Id:

Also handled via the Admin module 150.

The development platform 108 also allows for definition of an application specific authorization provider via the Providers and Executors Module 130. After successful authentication and if any defined authorization provider allows access, the user is redirected to the original URL to which access was attempted. This is typically one of the web containers 310—Home or OneView.

UI Markup Generation

Once a web container 310 is loaded onto a browser 106, the next step is to retrieve the UI configuration. This is served up by the Configuration Service Module 652 of the AJAX endpoints component 320 and occurs in three steps for the multi-page container (Home) and in two steps for the single-page container (OneView). Home first pulls in the page level and summary information for pages that are configured for that container and that the user has permission to view in the first two steps. This summary information is used to generate the page toolbar, for example page toolbar 2110, navigation tab and certain master data—in particular the list of values for all configured picklists. Individual page configuration is retrieved lazily in the third step when the user navigates to the page the first time. Each page definition 1530 in the configuration specifies a Javascript layout function which is invoked to generate the markup for the page. This function is defined in Layout Function Module 630 of the Application Web JS component 312. The platform provides functions for creating various UI components: grids, forms, toolbars and trees, for example, toolbars 2110 and 2140 and form 2150. These are then stitched together by the layout function into a single view. Once the layout for the page is rendered, the load function of the Load Function Module 632 is called. Similar to the layout function, the load function is optionally specified in each page configuration. This function is intended to load data into the page. The load function interacts with controller scripts in the Web JS component 314 of the Web Module, which in turn interacts with the AJAX endpoints 320 of the server part of the Web Module 120.

Main-Views, Controllers and Widgets

This section describes the Javascript APIs and components provided by the Web JS component 314 of the Web Engine module 120. These are categorized into Main-Views, Controllers and Widgets. This section describes the Javascript APIs and components provided by the Web JS part of the Web Module. These are categorized into Main-Views 610, Controllers 612 and Widgets 614.

Main-Views:

The main view components 610 is the overall page layout. There are two parts to each main view—the navigation menu and the page section. The navigation menu lists out the pages available to the user. On clicking a particular page name, the page is presented to the user in the page section. There are two available main views—GTP (e.g., shown in FIGS. 21 and 22), which lays out the navigation menu on the left in a tree structure with collapsible nodes and the page section on the right; and TAB, which lays out the pages in a tab layout with the navigation menu as tab headers. The main view to be used is configurable in config.xml.

Controllers:

Controller components 612 are wrappers around composite UI elements grids, forms, charts, toolbars and trees. They provide a uniform API to create and manipulate these elements as provided by the underlying Ext JS library 316. These are invoked from the application specific layout functions of module 630 to create these various elements and arrange them on the page. The controllers 612 also provide functions to manipulate the elements and the data they contain including but not limited to, clearing, loading, adding rows to, removing rows from, updating rows of grids, saving, creating and deleting data in forms, loading trees etc. The controllers 612 automatically interact with the providers associated with grids, forms and trees via the AJAX end points 320 as necessary to manipulate the data it displays.

Widgets:

Widget components 614 are the fields within the composite UI elements. Most are wrappers around fields provided by Ext JS library 316. Some are custom. Each of them have a corresponding server-side representation that they are transformed to when controllers 612 interact with the providers. The widgets available are:

Datetime: Represents a date time object. Currently only supports setting the date. Dates are always displayed in the user's time zone.

Link: Read-only field that reacts to the click event to invoke an application defined Javascript function. Used only in grids.

Lookup: Compound field with dual triggers. One trigger clears the value. The second pops up a grid that allows the user to select a particular record and set it as a value. Used in forms and grids to represent a reference to a particular record.

Money: Represents a monetary value. It has two parts—the currency and the amount. The value is displayed formatted with the currency symbol.

Selection: Represents a field whose value is picked from a list of discrete values.

The AJAX End Points. The AJAX End Points 320 are the mechanism by which the web containers 310 and the Application Web JS component 312 communicate with the server 112. They are grouped together by function. The wire format is JSON and it leverages the native serialization/de-serialization features of the platform. The services provided are:

The User Management Service:

The User Management Service Module 650 is primarily used by the standard username/password challenge authentication scheme and the OTP challenge authentication scheme. In the standard username/password challenge scheme, the development platform maintains properly hashed username and password credentials in the persistence system 190 or 192. In addition to a method to authenticate the user given a username and password pair, this service also provides methods to reset and change a user's password. The service also provides a method for OTP authentication. This service is also used to track usage statistics, the metrics for which are defined by the application deployed on the platform.

The Configuration Service:

The Configuration Service Module 652 delivers page configuration data to the web containers. It provides three methods:

Initialize:

This is called when the web container 310 is first loaded after the user logs in. This is the first step in generating the page layout. It is passed in the user's metadata. This metadata is passed to any configured session initializer. The session initializer is given the opportunity to modify or add to the user's metadata. This method then retrieves all picklists and any page-level toolbar targeted to that web container. All of this data is then returned back to the web container 310 and is made available as global Javascript objects in the web container 310.

GetNavConfiguration:

This is called to retrieve the page metadata that populate the web container 310 and for the pages that the user has permission to access. The returned data from this method is used to create the navigation panel, e.g. navigation panel 2210 of FIG. 22, of the web container.

GetPageConfiguration:

This is called in the third step of web container layout to pull in all of the composite UI components that are contained in a page.

The Grid Service:

Grid Service Module 654 provides methods for grids to load data, remove, add and update rows. The methods are:

Get:

Accepts as parameters the starting and ending row number, the grid name, sort column, sort direction, filter string and the arguments used to retrieve data, returns a set of rows to populate the corresponding grid with data. Also accepts a refresh flag. If the flag is true, any cached data is purged and fresh data is loaded directly from the persistence system 190 or 192.

Add:

Accepts as parameters the grid name and a list of key-value pairs. Each element of the list represents a row to be added. Each set of key-value pairs represent the column name and the value to set for that field.

Update:

Accepts as parameters the grid name and a list of key-value pairs. Each element of the list represents a row to be updated. Each set of key-value pairs represent the column name and the value to set for that field. Null values must be explicitly specified. Absence of a column name implies that field will not be modified.

Delete:

Accepts as parameters the grid name and a list of key-value pairs. Each element of the list represents a row to be deleted. Each set of key-value pairs represent the column name and the value to set for that field.

The methods above pass the call on to the appropriate TableDataProvider object 818 (see Providers and Executors module 130 and FIG. 8) configured for the grid. Prior to this, the provider's CheckAccess( ) method is called to confirm the user has permission to execute that operation for the Add Update and Delete methods.

The Form Service:

Provides methods for forms to load, remove, add and update data. The methods are:

Get:

Accepts as parameters the form name, primary key of the record to be shown, and the arguments used to retrieve data, returns a set of fields to populate the corresponding form with data. Also accepts a refresh flag. If the flag is true, any cached data is purged and fresh data is loaded directly from the persistence system.

Add:

Accepts as parameters the form name and a set of key-value pairs. Each key-value pair represent the field name and the value to set for that field.

Update:

Accepts as parameters the form name and a set of key-value pairs. Each key-value pair represent the field name and the value to set for that field. Null values must be explicitly specified. Absence of a field name implies that field will not be modified.

Delete:

Accepts as parameters the form name and a set of key-value pairs. Each key-value pair represents the field name and the value to set for that field.

The methods above pass the call on to the appropriate FormDataProvider (see the Providers and Executors Module 130 and FIG. 8) configured for the form. Prior to this, the provider's CheckAccess( ) method is called to confirm the user has permission to execute that operation for the Add Update and Delete methods.

The Tree Service:

Trees are read-only as of this version. So the Tree Service Module 658 provides a single method to load data. Trees may be loaded one node at a time upon expansion of that node the first time. So this method accepts as parameters the tree name, the full path to return data for, the arguments to use for the search criteria and the refresh flag.

The Chart Service:

Charts also are read-only components. Given the chart name, the arguments to be used for the search criteria and the refresh flag, the Chart Service Module 660 returns the data to be used to populate a chart.

Action Execution Service:

The Action Execution Service Module. The Action Execution Service provides a single method that accepts an action name, the executor name as defined in the configuration module and a set of arguments as a list of key-value pairs. The service looks up the specific executor and passes on the action name and arguments to the executor. The executor may return an arbitrary object that is passed on to the caller who may interpret is as it chooses. This service provides AJAX-enabled API's to execute actions that are not simple CRUD operations tied to the UI components. It provides a single method:

Execute: Accepts as parameters the name of an executor as specified in the Configuration Module, the action name to execute and a set of key-value pair arguments. The call above looks up the Executor from the DataProviderManager (see discussion of Providers and Executors 130) and passes on the action and arguments to the appropriate Executor to process the request and return any data back to the browser.

Figure 16:
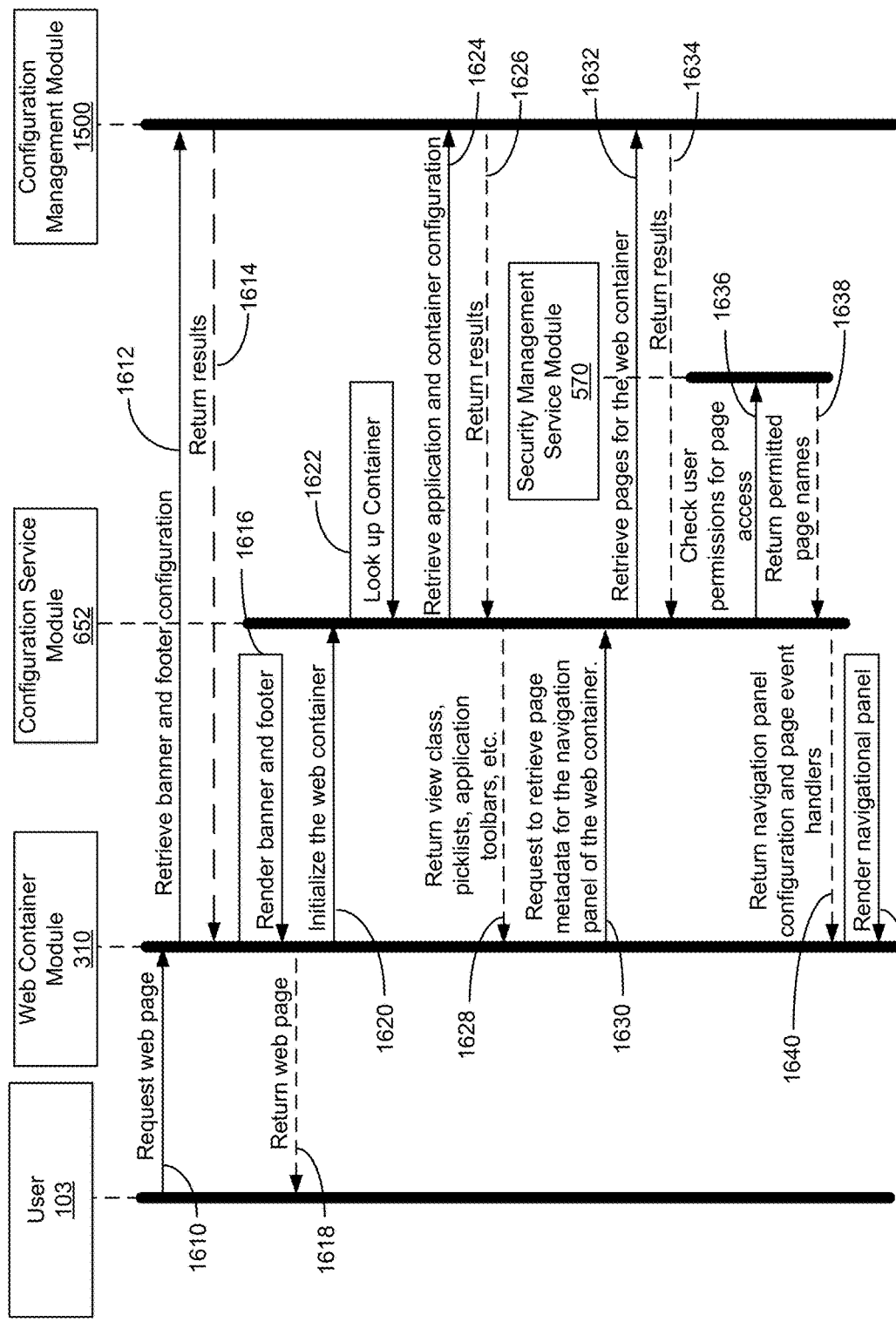
FIG. 16 is a sequence diagram for generating a user interface, including set up of page navigation components, according to one embodiment of the disclosed technologies.
Figure 17A:
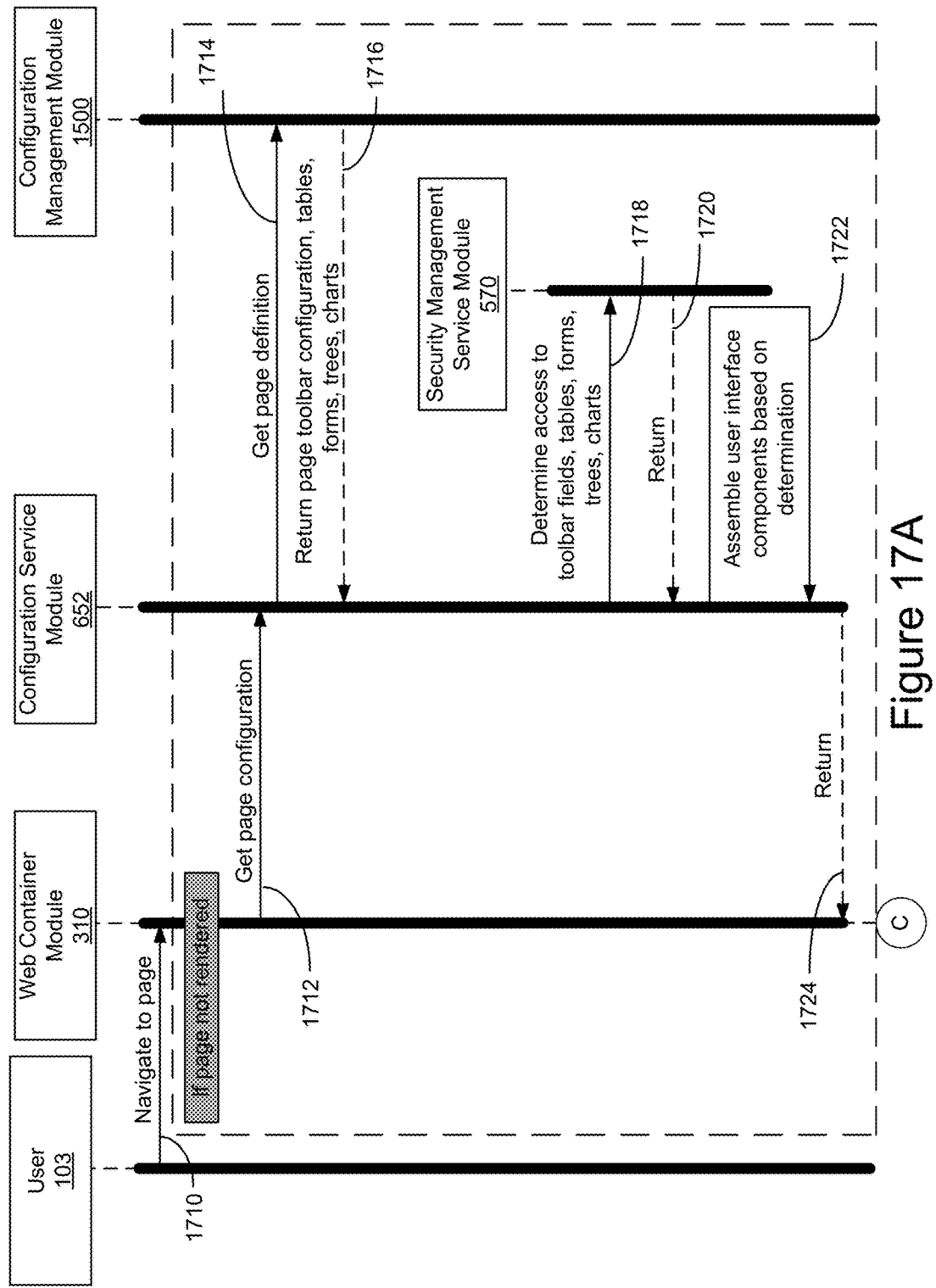

Referring now to FIGS. 16, 17A, and 17B, the methods for dynamic generation of a user interface are described in more detail through sequence diagrams.

FIG. 16 is a sequence diagram for dynamically generating a user interface, including set up of page navigation components, according to one embodiment of the disclosed technologies. The sequence may begin by the user, at 1610, requesting a web page of an application deployed on the development platform 108 of server 112. This request for a web page will be first received in browser 106 of client 104 and handled by the web container module 310 loaded onto the browser 106. At 1612, the web container module 310 will communicate a request to configuration management module 1500 of the configuration engine 180 for retrieval of banner and footer configuration parameters among the metadata 1510. At 1614, configuration management module 1500 may retrieve the banner and footer configuration and return the results to web container module 310. At 1616, the web container module 310 may render the banner, and footer, e.g. banner 2220 and footer 2240 of FIG. 22, of the web page, and at 1618, return the web page.

The sequence, at 1620, may proceed to initialize the web container whereby web container module 310 makes a call to the configuration service module 652 of AJAX endpoints 320 on the server-side of the web module 120. At 1622, the configuration service module 652 looks up the container 310, and at 1624, the configuration service module 652 makes a request to retrieve the application and container configuration from the configuration management module 1500 based on the determined container, i.e. Home or OneView. At 1626, the configuration management module 1500 returns the retrieved application and container configuration metadata to the configuration service module 652. At 1628, the configuration management module returns the view class, picklists, application toolbars, etc. to the web container module 310.

The sequence, at 1630, may then proceed to retrieve page metadata for the navigation panel of whereby the web container 310 issues a request to the configuration service module 652. The configuration service module 652 may, at 1632, make a call to configuration management module 1500 to retrieve pages for the web container. At 1634, the configuration management module 1500 will retrieve and return the results of the request for pages of the container 310 and return those pages to the configuration service module 652. At, 1636, the configuration service module 652 will make a request to the security management service module 570 of the core engine 110 to check user page access permissions. At 1638, the security management service module 570 returns names of pages where access is permitted to configuration service module 652. At 1640, configuration service module may return navigation panel configuration and page event handlers based on the determined page access permission. Finally, the web container module 310 may render 1642 the navigational panel in the browser 106 of client device 104 based on the received navigational panel configuration.

FIGS. 17A-17B are sequence diagrams for generating a user interface, including rendering a page when a user accesses the page for the first time, according to one embodiment of the disclosed technologies. The sequence may begin by the web container module 310 loaded on browser 106 of client device 104 receiving a request 1710 from a user to navigate to a web page. If the page has not been rendered on the browser 106, web container module 310 may make request 1712 to configuration service module 652 to retrieve the page configuration. The configuration management module 1500 may receive a request 1714 from configuration service module 652 to retrieve the page definition metadata. At 1716, the configuration management module 1500 returns to the configuration service module 652 page toolbar configuration, tables, forms, trees and charts, in response to the request for the page definition.

The sequence, at 1718, may then proceed to make a call to the security management service module to determine access to toolbar fields, tables, forms, trees and charts. The security management service module makes the determinations pertaining to access and returns 1720 the results to configuration service module 652. The configuration service module 652 may, assemble 1722 the user interface components based on the determination and return 1724 the results to the web container 310.

The web container sends a request 1726 to layout function module 630 to invoke a layout function. In one embodiment the layout function may be a layout function in JavaScript. For each user interface component, the layout function module 630 may, at 1728, send a request to controller component 612 of the Web JS module 314 for creation of components of the user interface. At 1730, the controller component 612 returns the user interface components to the layout function module 630. In response, the layout function module 630 renders 1732 the layout of the user interface components for the page and returns 1734 the results to the web container module 310. In one embodiment, at 1738, the web container 310 may invoke an afterActivate( ) method handler, if the handler is defined. The afterActivate( ) method is an event handler that is part of the Event Handlers 634. If defined for a page, it is invoked every time a user navigates to a page. If this is the first time a user navigates to a page, it is invoked after the page has been rendered (after the LayoutFunction( ) call) and after the page has been loaded (after the LoadFunction( ) call). Applications may implement application-specific functionality in this method. The function name is configured as part of the Page Definitions (1530) metadata. Finally, at 1738, the web container module 310 renders the page to user 103 via the browser 106.

Figure 7:
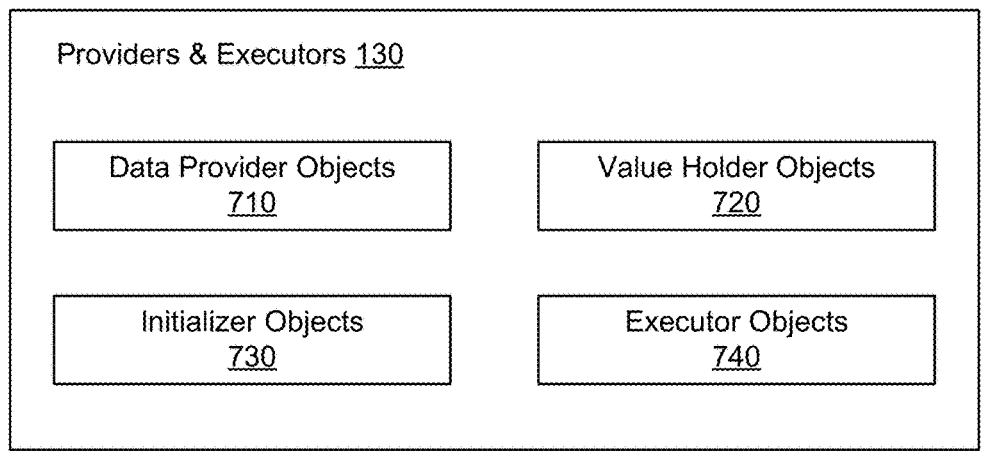
FIG. 7 is a block diagram of an embodiment of a providers and executors module for providing provider and executor objects utilized in the development platform.
Figure 8:
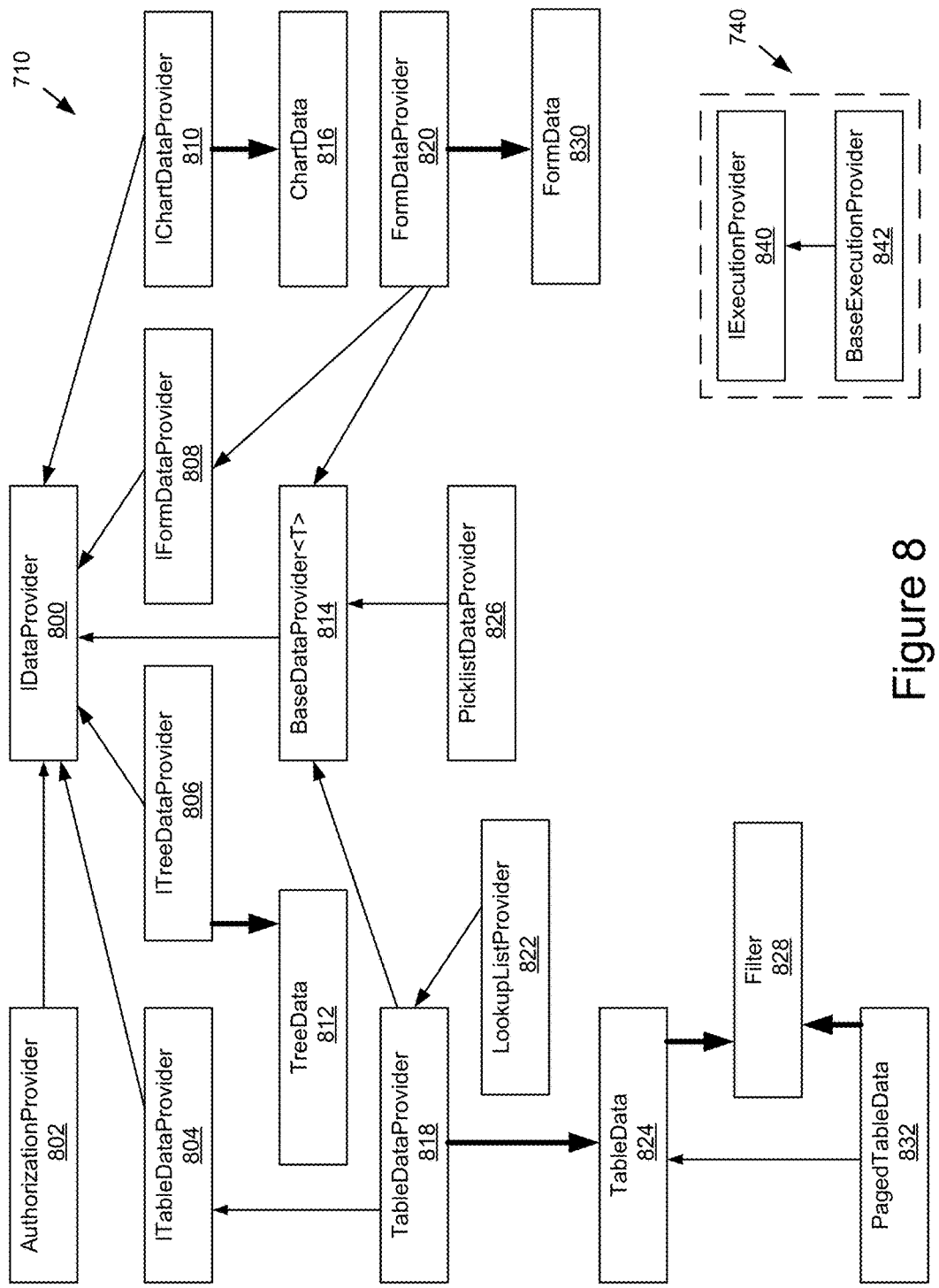
FIG. 8 is a block diagram of an embodiment of a data provider type class of objects and executor type class of objects including in the providers and executors module of the development platform.

Referring now to FIGS. 7 and 8, the operation and structure of the provider and executor objects is described in more detail. FIG. 7 is a block diagram of one embodiment of providers and executors module 130 for providing provider and executor objects 710, 720, 730, and 740 utilized in the development platform 108. Providers and executors module 130 contains four categories of objects 710, 720, 730, and 740. The first category are data providers 710. These are responsible for the co-ordination of application data management between the Web Module 120 and the Application Providers module 140. All providers implement the IDataProvider interface (or one of its derived interfaces) and extend the BaseDataProvider class. FIG. 8 below shows a class diagram for this category of objects 710. IDataProvider 800, ITableDataProvider 804, ITreeDataProvider 806, IFormDataProvider 808, and IChartDataProvider 810 are interfaces. BaseDataProvider<T> 814, TableDataProvider 804, FormDataProvider 820, and FormData 830 are abstract classes. TreeData 812, TableData 824, PagedTableData 832, Filter 828, LookupListProvider 822, PicklistDataProvider 826, and ChartData 816 are concrete classes. Line arrows represent inheritance, block arrows represent "uses".

Inherited from the IDataProvider 800, are four interfaces. Implementations of each of these interfaces manage data that is displayed in one of the four UI components. All concrete implementations of the providers inherit from the generic abstract class BaseDataProvider 814 either directly or indirectly. The only exception is the special purpose provider, the AuthorizationProvider 802, which implements the IDataProvider 800 interface directly.

The Application Data Providers 710 that manage data made accessible to users via the grid or table UI component extend from the TableDataProvider 818 class. The GetData( ) method of this class returns an instance of TableData or PagedTableData or an instance of a class derived from one of these classes. This method typically interacts with the ORM Module 170, running configured queries to return the data that fit the search criteria passed in to the method as a list of key-value pairs. The interpretation of these key value pairs is left to the derived Application Data Provider. These instances in turn, provide methods to add, update and delete the data they contain. The difference between the TableData 824 class and PagedTableData 832 class is that the former loads the entire set of rows that fit the search criteria used which the PagedTableData 832 retrieves a subset at a time, which allows it to be much more scalable for large data volumes. In some embodiments, the QueryContextModule aids the PagedTableData 832 for this purpose. The filter class is used by a TableData 824 instance for in-memory filtering of rows.

Data that is displayed in forms is managed by classes that extend the FormDataProvider 808. The Get( ) method is implemented by an Application Data Provider class that returns an instance of a FormData 830 derived class. The derived class declares the actual fields shown on the form.

Trees and Charts are read-only and Application Data Providers that manage such data implement the corresponding interfaces directly. Implementations of the ITreeDataProvider 806 interface are required to return an instance of TreeData 812 while implementations of the IChartDataProvider 810 are required to return an instance of ChartData 816.

The module in FIG. 8 also provides three special purpose providers. All of the special-purpose providers are accessible through well-known names. To override any of these providers in the Application Provider Module 140, an inherited class must be defined and registered with the well-known name with the Configuration Module 180:

The PicklistDataProvider 826:

This provider is registered under the name "PicklistDataProvider". Given the name of a picklist defined in the Configuration Module, it returns a list of key-value pairs to populate dropdowns in picklist type fields. The data for picklists can be retrieved in four different ways:

When it maps to a picklist type field defined on one of the objects in the persistence system.

When it is mapped to a query defined in the data model configuration. This type of picklist contains a list of objects that match the query criteria specified.

When it is mapped to another provider that serves as a delegate that returns the picklist values. This is particularly useful when the rules to form the list of values is complex and can only be programmatically achieved.

When it is mapped to a list of values statically defined in the Configuration Module 180.

The LookupListProvider 822:

The LookupDataProvider 822, registered under the name "LookupDataProvider" is a simplified, read-only derivation of TableDataProvider 818. This is invoked to populate the popup grid for lookup fields.

The AuthorizationProvider 802:

The AuthorizationProvider 802 is registered under the name "AuthorizationProvider". This is called just after a user logs in passing in the user's metadata. The default implementation does nothing, but it can be overridden to deny access and/or to modify the user's metadata that is stored as a Javascript global object in the web container.

The AttachmentProvider:

The AttachmentProvider is used to download and upload files as attachments to various objects that allow such functionality in the underlying persistence system. It is front-ended by the Attachments.ashx web handler in the Web Module 120 and interacts directly with the ORM Module 170 and does not require any application specific implementation.

At the heart of the Providers and Executors module 130 module is the DataProviderManager. This component reads the configured data providers from the Configuration Module 180 and loads the implementations from the Application Providers Module 140 by reflection and maintains a map of the names and implementation instances. Other modules—in particular the Web Module 120—request an instance of the implementation by name which then proceed to invoke operations on the providers to fulfill business functionality.

The second category of objects are the Executors 740. These objects implement business functionality that are not necessarily CRUD operations—functionality that does not simply retrieve and store data between the web interface and the persistence system transforming and executing validations along the way. An example of an action could be to revise a quote or close an opportunity. Executors are accessed the same way as Providers—from the DataProviderManager.

The third category of value holder objects 720 contained in this module are compound types that are the server-side counterparts of the Web Module 120 widgets. These types implement the IFilterable interface that allows for in-memory filtering. These are:

Date: Represents a date time. Maps to the datetime widget.

Link: Represents a link. This is an over-ridable type that can be customized to add additional data to the value. Maps to the link widget.

Selection: Represents a key-value pair and maps to the selection widget.

Lookup: Represents a referential field and maps to the lookup widget. It has three attributes: the primary key of the referenced object, a display name and the type of the referenced object. It may be extended to add additional application-specific attributes.

Money: Represents an amount and currency pair and maps to the money widget.

Icon: This represents an image displayed in-line in grids. There is no corresponding widget in the Web Module. It uses a text field with a special renderer for display. An optional handler that is a javascript function invoked when the icon is clicked may be specified. A tooltip may also be optionally specified.

The fourth category of objects in this module are initializers 730. There are two extensible initializer interfaces provided. The implementation class is specified in the Configuration Module 180. The first is the IApplicationInitializer, which provides a single no-argument method Initialize( ). This is invoked from the Global.asax in the Web Module 120 upon the Application_Start event. The second is the ISessionInitializer, which is invoked just after the user has logged in and during initialization of the web container. ORM Engine 170

Figure 4:
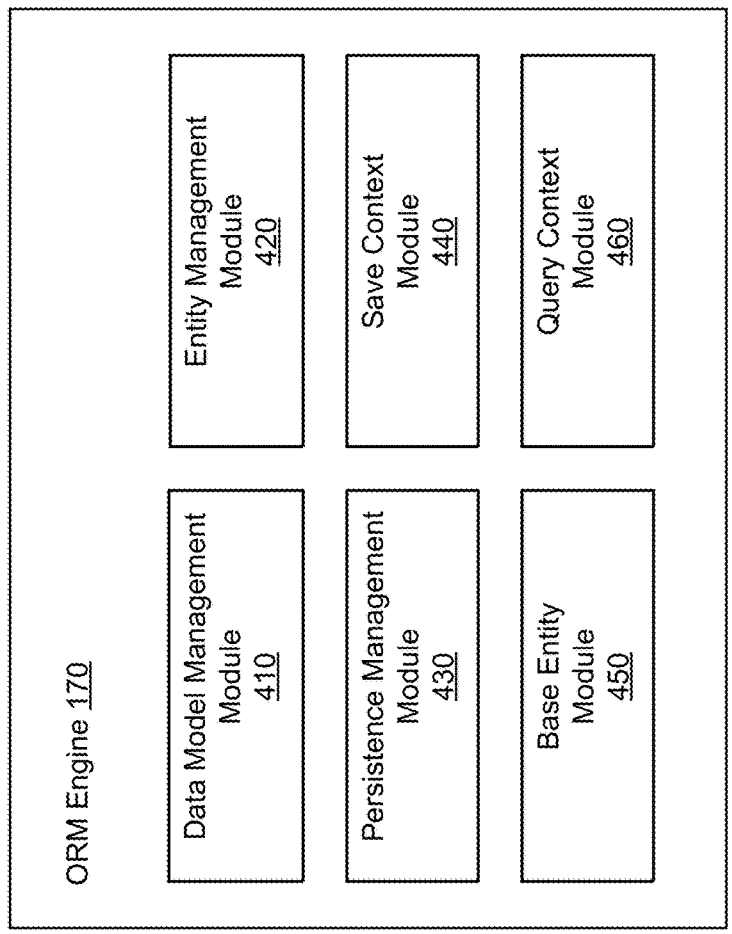
FIG. 4 is a block diagram of an embodiment of an object relational mapping (ORM) engine for providing persistence services against one or more third-party applications.

FIG. 4 is a block diagram of one embodiment of an object relational mapping (ORM) engine 170 for providing persistence services against one or more third-party application platforms. The ORM engine 170 exposes a consistent, coherent interface to other modules of the development platform 108 to interact with any online or on-premise persistence system 190 or 192, e.g. Microsoft Dynamics CRM version 4.0 through the latest 2016 release—online or on-premise, Salesforce and even a local RDBMS (currently only supports MS SQL Server). The ORM Module 170 abstracts out any schema and the query language in an online or on-premise persistence system 190 or 192 into generic forms with a well-defined mapping into actual persistence system types. ORM engine 170 interacts with the persistence system 190 or 192 using remote APIs defined by it. The ORM Engine 170 includes several module for abstracting out the schema and query language in a persistence system 190 or 192. In one embodiment, the ORM engine 170 includes Data Model Management Module 410, Entity Management Module 420, Persistence Management Module 430, Save Context Module 440, Base Entity Module 450, and Query Context Module 460.

Data Model Management Module 410 is the primary module through which users interact with the ORM Engine. It is responsible for managing the relationships between different classes of BaseEntity instances, determination of the appropriate Persistence Manager for the configured Persistent System and provide and implement several functions to interact with the ORM Engine. These functions are defined below (for the IDataModelManager interface). This module includes the IDataModelManager interface, the AbstractDataModelManager abstract class and any derived class from AbstractDataModelManager that is specific to a particular data model.

Entity Management Module 420, also referred to herein as an Entity Manager, manages the lifecycle of a single entity. In most cases, the DataManagerModule delegates calls to an instance of the EntityManager, if the DataManagerModule knows which entity the call is about. The EntityManagerModule is also responsible for managing cached instances of BaseEntity and it's derivatives, ensuring the data integrity and relationships of each instance of BaseEntity. It also provides API methods for BaseEntity instances to interact with the PersistenceManagementModule.

Persistence Management Module 430 This module is responsible for retrieving and storing data from the configured Persistent System. It is abstracted by the IPersistenceManager interface. It comprises of the IPersistenceManager interface, the QueryInfo, Condition, Expression, ParameterInfo, SortInfo objects. It also includes specific implementations of the IPersistenceManager interface, that map retrieve and store operations to the specific Persistent System. Queries in the format native to the Persistent System are generated just-in-time. This allows a certain amount of optimization at run-time where arguments not provided for a specific predicate clause are not included in the query at all, reducing the complexity of the query.

Save Context Module 440 is responsible for bulk saving a set of BaseEntity instances. BaseEntity instances (or their derivatives) are registered with a single instance of the SaveContext and changes made to these instances are tracked. When the Commit( ) method is called, the SaveContext object in this module re-arranges the list of candidates (to ensure data integrity—e.g. parents must be created before child objects) and stores them into the Persistent System via a bulk save method Persistence Management Module 430.

Base Entity Module 450 includes the BaseEntity abstract class, the Descriptors—CrmDescriptor, PersistenceDescriptor, FieldDescriptor, RelationshipDescriptor and the ManagedTypes. The Base Entity Module 450 and its components are described in more detail below with reference to the hybrid implementation mode.

Query Context Module 460, in one embodiment, is provided as a reverse of the Save Context Module 440. It is responsible for retrieving multiple instances of a BaseEntity (or a derivative) in a batched manner so as to not overwhelm the memory of the server the application is running on. It takes a QueryInfo object and breaks it up into two sub-queries (Though SQL terminology is used here, this applies to non-SQL based cloud storage services as well)—(a) a query with only the primary key column/field in the SELECT part of the clause, the complete predicate and any ORDER BY clauses and (b) a query with the full SELECT clause and the predicate replaced with an IN clause that comprises a list of Primary Key values. Query (a) is run first, one time only for a given set of arguments to the query. Then, query (b) is run with a sub-set of the primary keys to retrieve a "page" or sub-set of data. See FIG. 10A-10B for the flow of a paged query.

In one embodiment, the ORM Module 170 provides a hybrid implementation model. According to the hybrid implementation model, each table (in an RDBMS persistence system 190 or 192) or object (in Salesforce) or entity (in Dynamics CRM) are mapped by the Base Entity Module 450 via descriptor objects to an entity class. Each row or instance of an object maps to an instance of the entity class. The Base Entity module 450 provides specific compound types that map to field types in the persistence system. In one embodiment, each entity must also be defined in the Configuration Engine 180, together with attributes that specify the cache-ability and, most importantly, any queries that may be called against that entity class. In one embodiment, queries may be defined declaratively in the Configuration Engine 180. In one embodiment, multiple data-model definitions may be allowed, so long as the names are unique. In one embodiment, each data-model is managed by Data Model Management Module 410, also referred to herein as an implementation of an IDataModelManager interface, that provides methods for interacting with the entity class instances. In one embodiment, references to the appropriate IDataModelManager instance are obtained from a singleton Registry class, given the name of the data model.

The following sections describe how entity classes are declared and defined, how queries are declared and how the entity classes and queries are managed.

Data Model Definition

In one embodiment, the data model definition has two parts—one specified in the Configuration Engine 180, specifically in the config.xml, and the other implemented as part of the Application Providers module 140. Each entity class must have a declaration in the config.xml with a name that is unique within that data model definition. In the Application Providers module 140, a class (the Base Entity derivative) must be defined that directly or indirectly inherits from the BaseEntity class, which is defined in the ORM Engine 170, for each of the entity classes. In addition, an implementation of the IDataModelManager interface that also extends the AbstractDataModelManager abstract class must be defined, that maps the entity name to the implementation class. This IDataModelManager implementation class is specified in the configuration. The entity implementation class is annotated with descriptors declared at the class level (the CRMDescriptor)—to map the class to a corresponding persistence system object/entity/table—and at the field/property level (the FieldDescriptor)—to map to a field in the persistence system object/entity/table. In addition referential fields—references or foreign key fields to other objects/entities/tables have to be annotated by the RelationshipDescriptor. Each of the descriptors have a name that is used as an identifier for that field or related entity in query definitions. For a referential field, the name of the FieldDescriptor and the RelationshipDescriptor must be the same. In addition, if the relationship is navigable bi-directionally, the corresponding field on the other entity class must be annotated with a RelationshipDescriptor of the same name.

The table below shows the mapping between field types defined in the ORM Engine 170 and types in the supported persistence systems 190 and 192. It also lists out the native type enclosed by the field type of ORM Engine 170.

| ORM Type | Dynamics CRM Type | Salesforce Type | .NET Type |
|---|---|---|---|
| StringType | Text/Long Text | Text | string |
| IntType | Integer | Integer | Int32 |
| BoolType | Yes/No Picklist | Boolean | bool |
| DateTimeType | Date/DateTime | Date/Datetime | Datetime |
| DecimalType | Decimal/Float | Float | decimal |
| MoneyType | Currency | Currency | money(Custom struct) |
| PicklistType | Picklist | Picklist | KeyValuePair |
| Connector | Lookup | Lookup | BaseEntity |

Query Definition

To retrieve data from a persistence system 190 or 192, each entity class may be associated with one or more queries. No code needs to be written. All queries are declarative and adhere to a persistence system's agnostic schema and defined in the Configuration Engine 180. Each query defined must have a unique name. A query definition has two parts—the SELECT part and the PREDICATE part.

The SELECT part defines the fields to be loaded into each instance of the entity class returned as a result of the query. It also specifies fields from related entity classes that are loaded together with the primary entity. The number of such related entities specified in a query and the depth of nesting is only limited by the underlying persistence system.

The PREDICATE part defines the search criteria for the query. The unit of the criteria is an Expression declaration consisting of a field—related entity field path may be specified by a dot notation (e.g. Company.Contact.First-Name)—an operator (Equal, NotEqual, Like, NotLike, LessThan, LessThanEqualTo, GreaterThan, GreaterThanEqualTo, In, NotIn, Null, NotNull) and either a hard-coded value or a parameter name (in which case it must start with an @). Expressions are nested within Condition declarations together with a Conjunction (And, Or). Each Condition declaration may have one or more Expression declarations and/or one or more nested Condition declarations.

Data Model Activation

Each data model is activated by the Configuration Module 180 by instantiating a singleton instance of the IDataModelManager implementation class and registering it with the singleton Registry class. Upon instantiation, the singleton instance is passed in the entire data model configuration to a method defined in the parent class AbstractDataModelManager. This method instantiates a singleton EntityManager instance for each entity class. The EntityManager is then passed in the configuration for each entity class for validation and further processing, including query processing. In addition to declared queries, the EntityManager also creates the implicit query FindByPrimaryKey, which returns a single instance of an entity class given the primary key, and related entity queries, which are used internally to load related entities, given the key value.

Working with the ORM Module

The IDataModelManager is the primary access point into the ORM Module. Users obtain a reference to an instance via the singleton Registry object. The IDataModelManager provides the following methods:

CreateInstance(string, Euid): Creates an instance of an existing record, given the name of the entity and the primary key.

Create(string): Creates an anonymous or new instance of an entity.

FindByPrimaryKey(string, Euid): Given the entity name and primary key, loads and returns an instance of the entity class.

Fetch(string, string, Dictionary): Runs a named query declared in the configuration. It accepts as parameters the entity name, query name and the arguments for the query.

GetPicklist(string, string): Given an entity and field name, returns the list of key-value pairs for a Picklist type field.

CreateQueryContext(string, string): Returns a query context given an entity name and the query name. QueryContexts are used to run paged queries where results are retrieved from the persistence system in batches.

CreateSaveContext( ): Creates an instance of ISaveContext (in the Save Context module 440).

SystemCall(string, BaseEntity, Hashtable): This method is used to invoke business operations directly in the underlying persistence system.

bool HasField(string entityName, string fieldName): Metadata access method that returns whether a certain field is defined in a BaseEntity derivative.

Type GetFieldType(string entityName, string fieldname): Metadata access method that returns the Type of a field defined in a BaseEntity derivative.

bool HasRelationship(string parentEntityName, string relationName): Metadata access method that returns whether a certain relationship is defined fin a BaseEntity derivative.

string GetRelatedToByRelationName(string parentEntityName, string relationName): Metadata access method that returns the related BaseEntity derivative, given a relationship name.

Types.Connector.TYPE GetRelationshipCardinality (string parentEntityName, string relationName): Metadata access method that returns the cardinality (one-to-many, many-to-one) of a relationship defined in a BaseEntity derivative.

List<String>GetFieldNames(string entityName)

List<String>GetRelationNames(string entityName)

Figure 9:
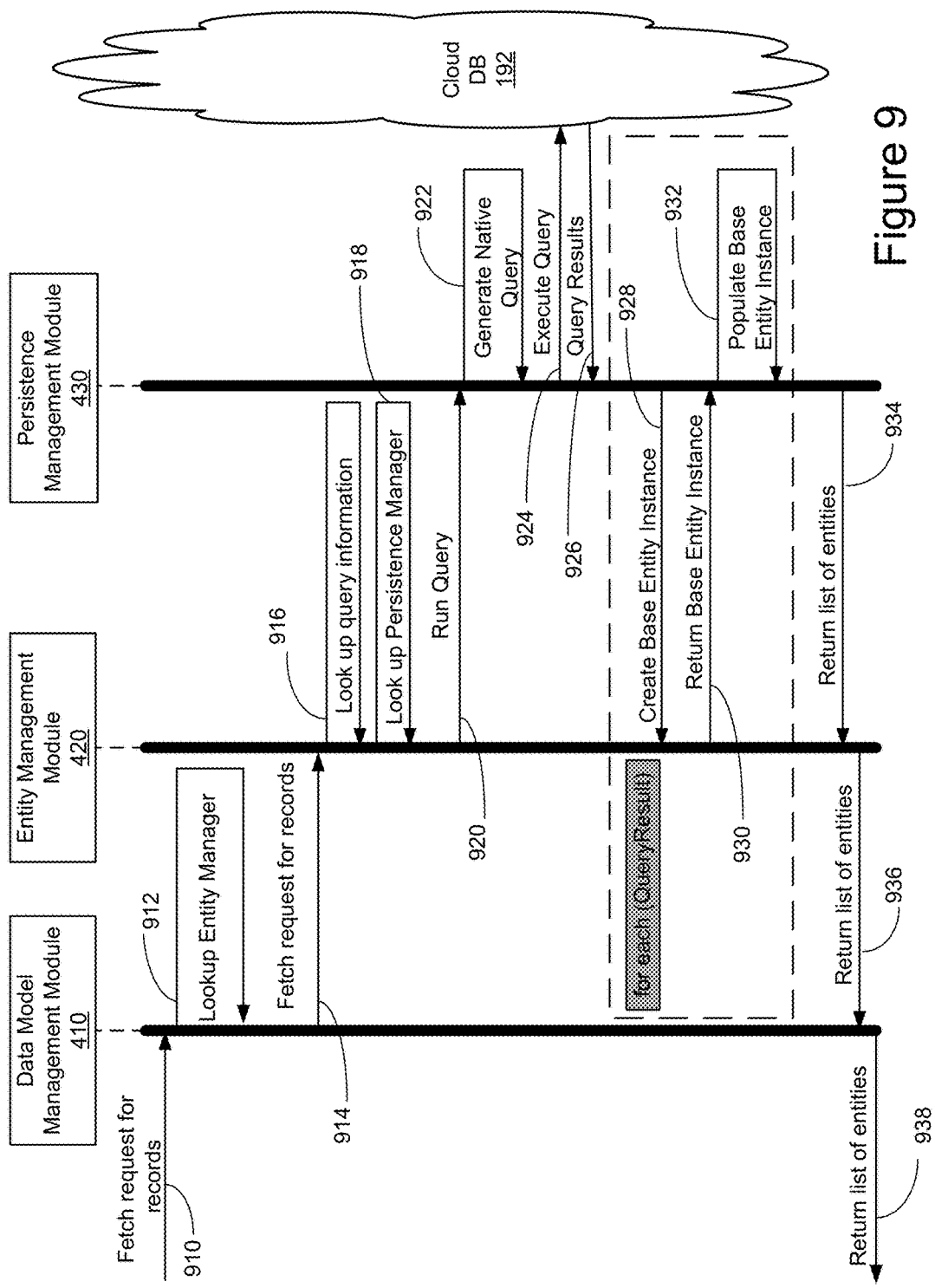
FIG. 9 is a sequence diagram for execution of a non-paged query against a third-party application platform, according to one embodiment of the disclosed technologies.

FIG. 9 is a sequence diagram for execution of a non-paged query against a third-party application platform 190 or 192, according to one embodiment of the disclosed technologies. At 910, a fetch request is made to data model management module 410 for records related to an entity. At 912, the data model management module 410 determines the entity manager responsible for managing the lifecycle of the entity. In one embodiment, the determined entity manager, i.e. entity management module 420, receives 914 a fetch request for the records related to the entity it manages. At 916, the entity management module 420 looks up the query information related to the entity. In one embodiment, the query information is syntactically agnostic of the underlying persistence system 190 or 192. The entity management module 420 then determines 918 the Persistence Manager, also referred to herein as a persistence management module 430, for handling this fetch request for records related to the entity. In one embodiment, there may be multiple persistence managers, e.g. Persistent Management Modules 430, and each persistence manager may manage queries that may be performed on a specific persistence system 190 or 192. In one embodiment, the persistence system may be a cloud-based database 192. In another embodiment, the persistence system may be an on-premises third-party application platform.

Upon determining the appropriate persistence manager for handling the query, Entity Management module 420 sends 920 a request to the determined Persistent Management module 430 to run the query. Upon receiving the request, Persistence Management module 430 will parse the query and generate a query native to the persistence system 190 or 192. Persistence Management module 430 will then send 924 request to the persistence system 190 or 192 to execute the generated native query. Persistence system 190 or 192 will process the request and return 926 the query results for the requested records. For each query result, Persistence Management module 430 will send a request 928 to the Entity Management Module 420 to create a base entity instance for the query result. The Entity Management Module 420 returns 930 the created base entity instance to the Persistence Management module 430 to populate the base entity instance. The Persistence Management module 430 populates 932 each base entity instance created from each query result and returns 934 the list of entities or records to the Entity Management module 420. Finally, the Entity Management module 420 returns 936 the list of entities or records to the Data Management module 410 which returns 938 the list of entities to the caller. In one embodiment, the caller may be the Providers and Executors module 130 responsible for the co-ordination of application data management between the Web engine 120 and the Application Providers module 140.

Figure 10A:
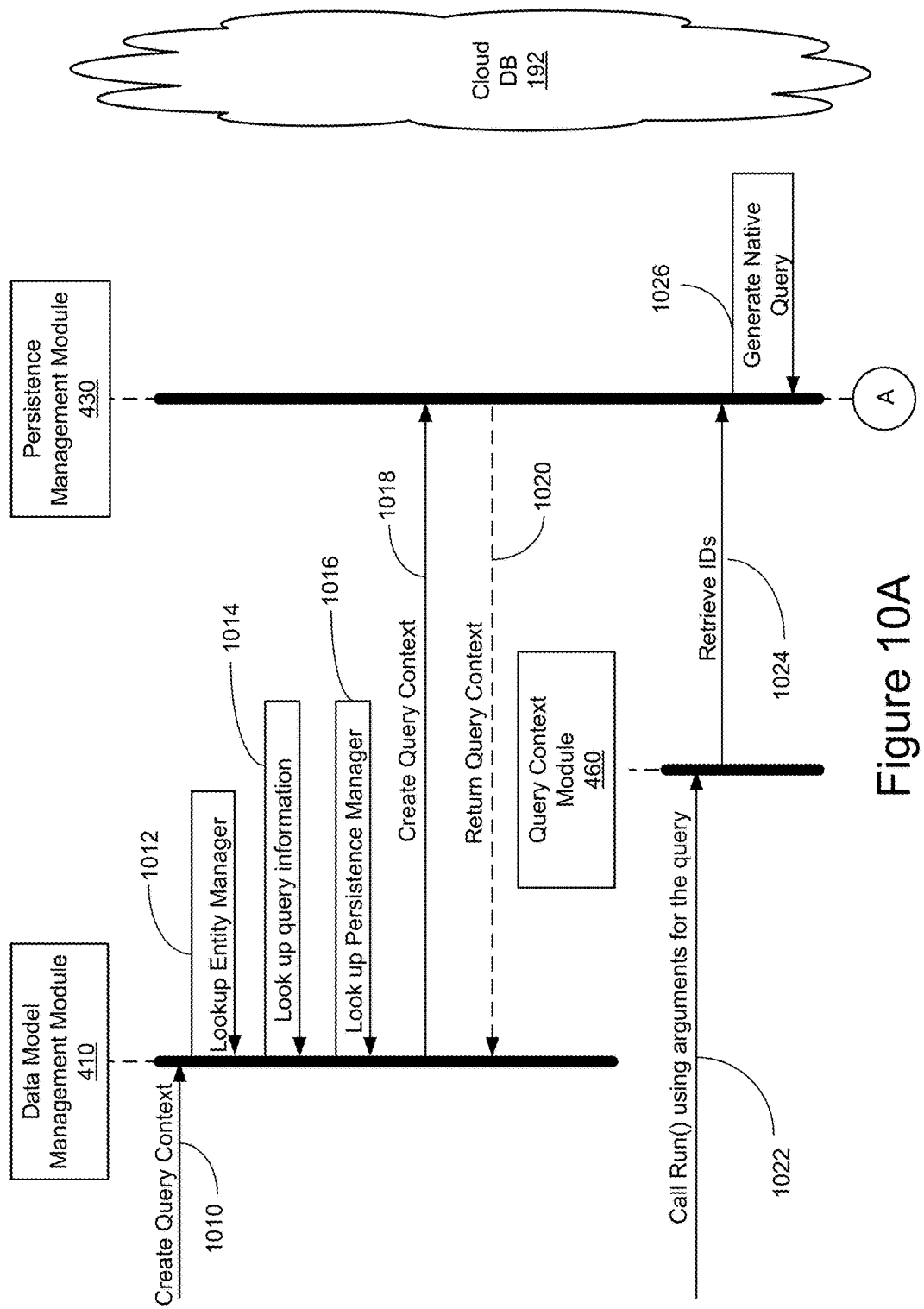
FIGS. 10A-10B are sequence diagrams for execution of a paged query against a third-party application platform, according to one embodiment of the disclosed technologies.
Figure 10B:
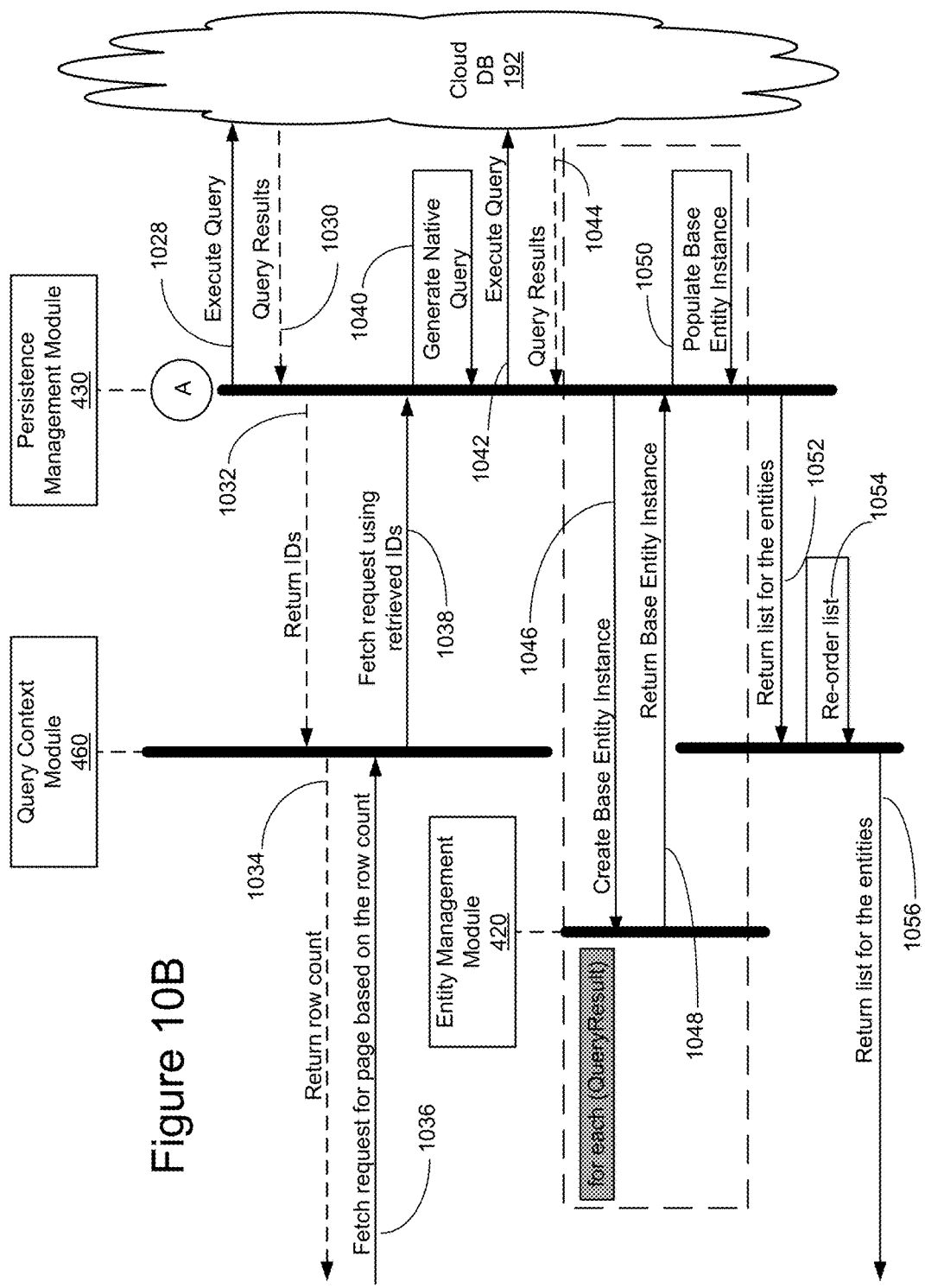

FIGS. 10A-10B are sequence diagrams for execution of a paged query against a third-party application platform, according to one embodiment of the disclosed technologies. Sequence 1000 may begin where a request 410 is sent from the Providers and Executors module 130 to Data Management module 410 to create a query context. A query context is a container and processor for a paged query. Upon creation, it is passed in an instance of a QueryInfo object whose results may be retrieved in batches so as to not overwhelm the memory of the server. It provides the following methods:

Integer Run(OrderBy, Dictionary<string, object>args): This method breaks up the QueryInfo into two queries—one to retrieve the list of primary keys for the BaseEntity instances that match the PREDICATE for the query (any configured sort order may be overridden by the OrderBy passed into this method) and two to retrieve the actual BaseEntity instances that match a list of primary keys. The first query is run and the results stored in the QueryContext instance as a list of integer-indexed Euid objects.

BaseEntity[ ] Fetch(Integer from, Integer to): Returns the list of BaseEntity instances that match the primary keys indexes in the query context stored as a result of the Run( ) call.

In response to the request, Data Model Management module 410 determines 1012 the appropriate Entity Manager for this request, retrieves 1014 the query information, and determines 1016 the Persistence Manager. Given the Entity Manager, query information, and Persistence Manager, the Data Management Module 410 then sends 1018 a request to the determined Persistence Management module 430 to create 1018 a query context. The Persistence Management Module 430 processes the request and returns 1020 the query context to the Data Management Module 410. The caller may then call 1022 a Run( ) request against the Query Context module 460 using arguments for the query. In response, Query Context module 460 sends a request 1024 to Persistence Management Module 430 to retrieve identification numbers or codes (IDs) of an entity or object in persistence system 192.

Upon receiving the request for IDs, Persistence Management Module 430 generates 1026 a query native to the persistence system 192 for which it manages persistence operations. When the native query is generated, Persistence Management Module 430 sends a request 1028 to the persistence system 192 or 190 to execute the native query. In one embodiment, cloud-based database 192 will process the request and return 1030 the query results to Persistence Management module 430. Persistence Management Module 430 then returns 1032 the IDs to Query Context Module 460. Query Context module 460 returns 1034 a row count based on the received IDs to the caller. After the Run( ) call, a list of primary keys, IDs or Euid objects is retrieved. The return value is simply the count of primary keys. The sequence 1000 may now proceed with the caller sending 1036 a fetch request for pages based on the row count to the Query Context module 460. In response, Query Context module 460 sends 1038 a request to Persistence Management Module 430 to fetch the pages using the retrieved IDs. Persistence Management Module 430 generates 1040 a query native to the appropriate persistence system 192 and sends 1042 the native query to the persistence system 192 to execute. In one embodiment, cloud-based database 192 processes the request and returns 1044 the query results to its Persistence Management module 430 to Query Context module 460.

For each query result that is returned, Persistence Management module 430 sends a request 1046 to the Entity Management Module 420 to create a base entity instance for each result. Entity Management module 420 then sends 1048 the base entity instance for each result record to Persistence Management module 430. Persistence Management module 430 populates 1050 each base entity instance received and returns 1052 a list for the entities to the Query Context Module 460. Query Context module 460 will re-order 1054 the list based on a sort information order procedure. Finally, Query Context module 460 returns 1056 the list of the entities back to the caller.

Figure 11:
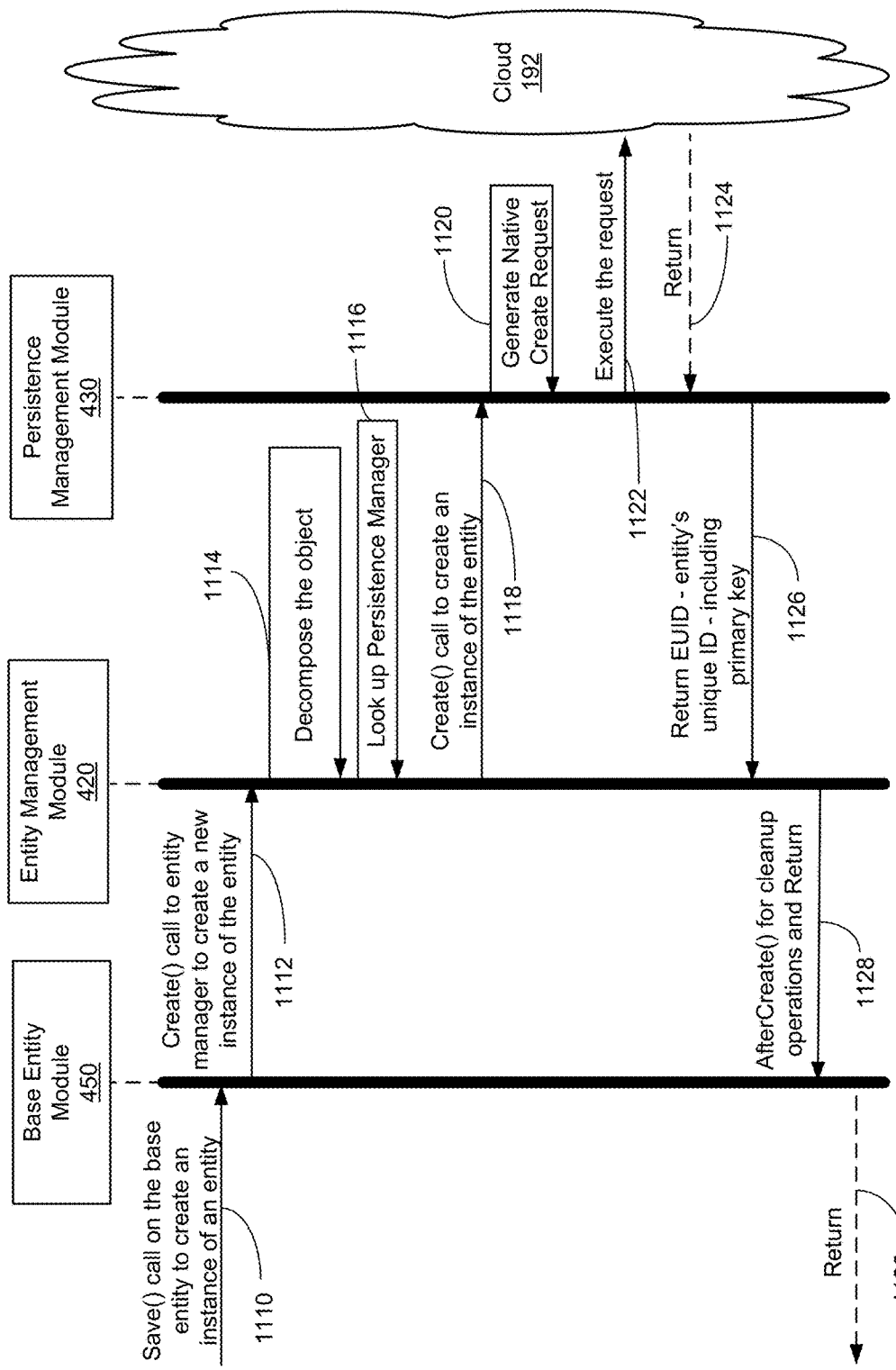
FIG. 11 is a sequence diagram for execution of a basic, single-entity record create operation against a third-party application platform, according to one embodiment of the disclosed technologies.

FIG. 11 is a sequence diagram for execution of a basic, single-entity record create operation against a third-party application platform, according to one embodiment of the disclosed technologies. The sequence may start with a Save( ) call 1110 on a base entity being sent to Base Entity module 450 to create an instance of an entity. In response, Base Entity module 450 sends a create( ) call 1112 to Entity Management Module 420 to create a new instance of the entity. In one embodiment, the Base Entity Module interprets the Save( ) call as a request to create a new instance of an entity. In another embodiment, the Base Entity Management Module 420 interprets the Save( ) call as a request to update or modify an instance of an entity (see discussion of FIG. 12). In response, Entity Management decomposes 1114 the object, determines 1116 the Persistence Manager, and makes a call 1118 to the determined Persistence Management module 430 to create an instance of the entity. In a BaseEntity instance (or derivative), data fields are stored as instances of ManagedType type. In a decompose operation, the ManagedType field values are broken down to basic types (integer, decimal etc) or to the simplest type possible (a key-value pair of a name and value for a PicklistType for example), pushed into a Hashtable that maps the persistent field names (specified in the FieldDescriptor object set on the BaseEntity instance) and the value of the ManagedType and returned. This is only done for any fields that have been modified or newly set. Persistence Management module 430 generates 1120 a create request native to the persistence system 192 to which is manages persist operations and sends 1122 the native create request to the persistence system for execution. The persistence system, e.g. cloud-based database 192, processes the request and returns 1124 results of the entity to the persistence management module 430. Persistence Management module returns the entity's unique ID (EUID), including the entity's primary key to Entity Management module 420. Entity Management module 420 sends an AfterCreate( ) request 1128 to the Base Entity Module 450 for clean-up operations after the entity has been created and returns the entity results to Base Entity Module 450. The sequence concludes with Base Entity module 450 returning 1130 the results of the entity to the caller.

Figure 12:
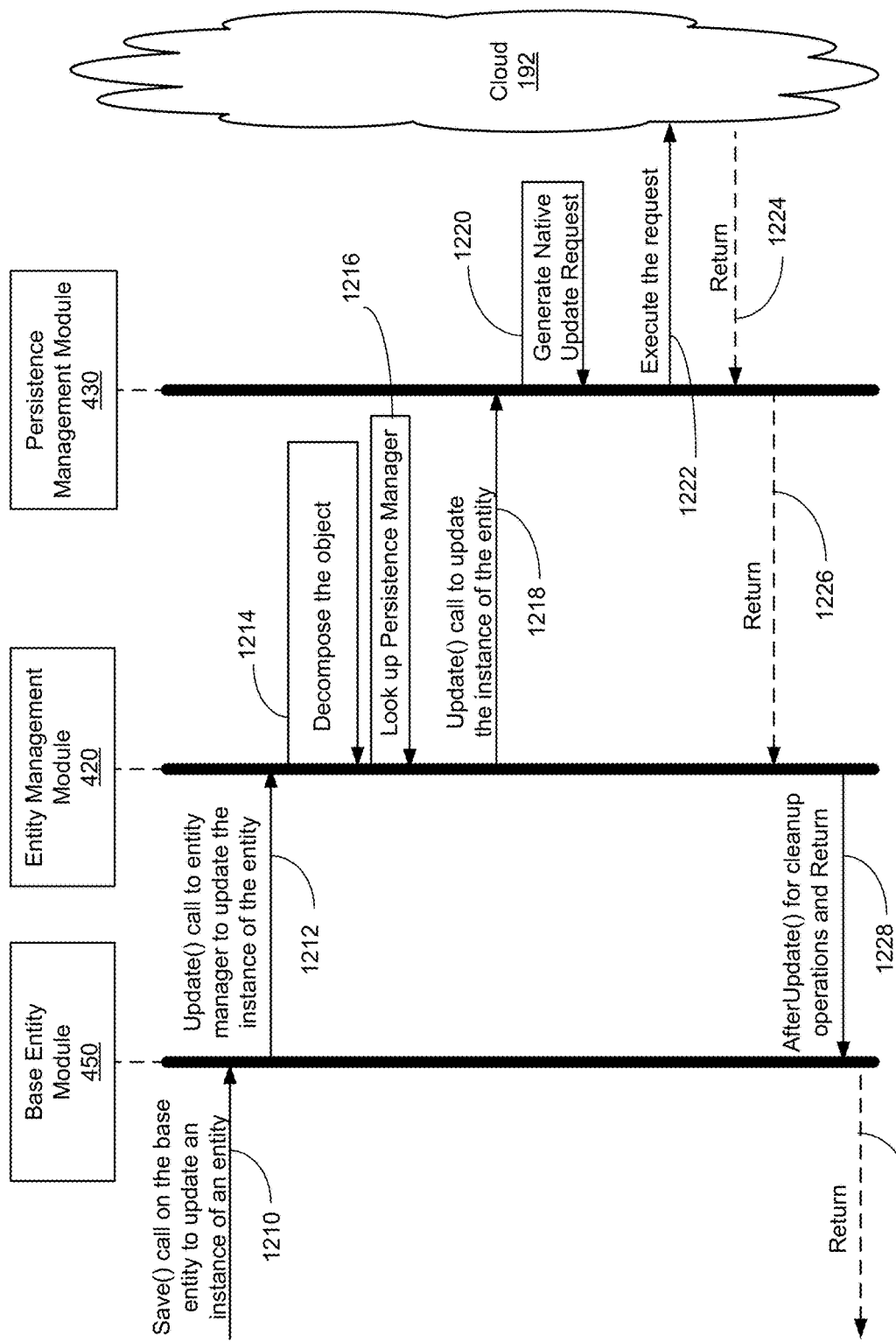
FIG. 12 is a sequence diagram for execution of a basic, single-entity record update operation against a third-party application platform, according to one embodiment of the disclosed technologies.

FIG. 12 is a sequence diagram for execution of a basic, single-entity record update operation against a third-party application platform, according to one embodiment of the disclosed technologies. The sequence begins with a Save( ) call request 1210 on a base entity being sent to Base Entity module 450 to update an instance of an entity. In one embodiment, the Base Entity Module 450 keeps tracks of the entities and therefore knows that this Save( ) call 1210 is for an update operation, as the entity already exists. In response, Base Entity module 450 sends an Update( ) call 1212 to Entity Management Module 420 to update an instance of the base entity. In response to the request to update, Entity Management Module 420 decomposes 1214 the object, determines 1216 the Persistence Manager, and makes a call 1218 to the determined Persistence Management module 430 to update the entity in the persistence system. Persistence Management Module generates 1220 an update request native to the persistence system 192 and sends 1222 the native update request to the persistence system 192 for execution. Persistence system 192 processes the update request and returns 1224 results to Persistence Management module 430. Persistence Management module 430 returns 1226 the results to Entity Management module 420. Entity Management module 420 sends an AfterUpdate( ) request 1228 to the Base Entity Module 450 for clean-up operations after the entity has been updated and returns the results to Base Entity Module 450. The sequence concludes with Base Entity module 450 returning 1230 the results of the update request to the caller.

Figure 13:
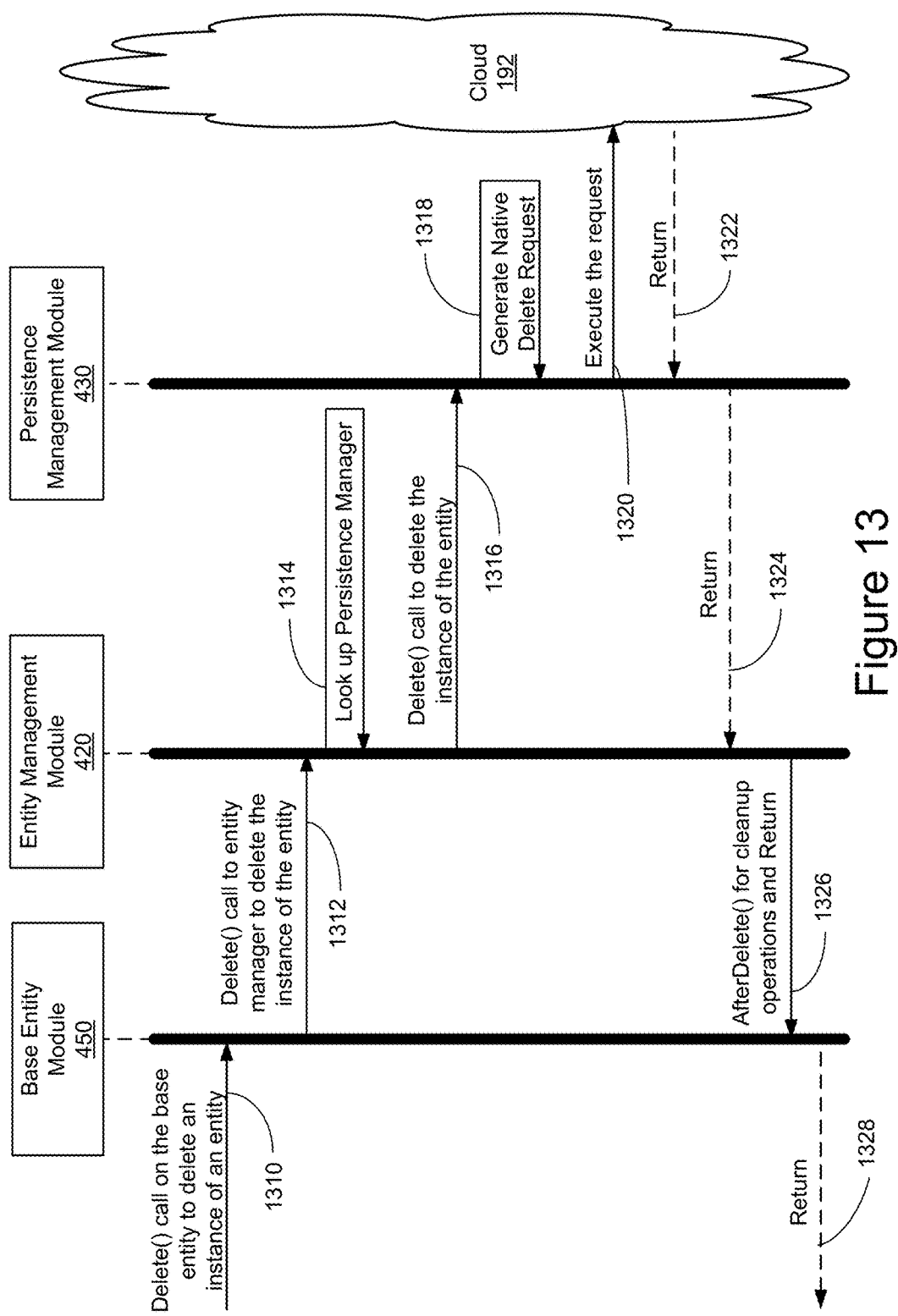
FIG. 13 is a sequence diagram for execution of a basic, single-entity record delete operation against a third-party application platform, according to one embodiment of the disclosed technologies.

FIG. 13 is a sequence diagram for execution of a basic, single-entity record delete operation against a third-party application platform, according to one embodiment of the disclosed technologies. The sequence begins with a Delete( ) call request 1310 being sent to Base Entity module 450 to delete an instance of an entity. In response, Base Entity module 450 sends a Delete( ) call 1312 to Entity Management Module 420 to delete the instance of the entity. In response to the request to delete, Entity Management Module 420 determines 1314 the persistence manager, and makes a call 1316 to the determined Persistence Management module 430 to delete the entity in the persistence system. Persistence Management Module generates 1318 delete request native to the persistence system 192 and sends 1320 the native delete request to the persistence system 192 for execution. Persistence system 192 processes the update request and returns 1322 results to Persistence Management module 430. Persistence Management module 430 returns 1324 the results to Entity Management module 420. Entity Management module 420 sends an AfterDelete( ) request 1326 to the Base Entity Module 450 for clean-up operations after the entity has been deleted and returns the results to Base Entity Module 450. The sequence concludes with Base Entity module 450 returning 1328 the results of the delete request to the caller.

Figure 14A:
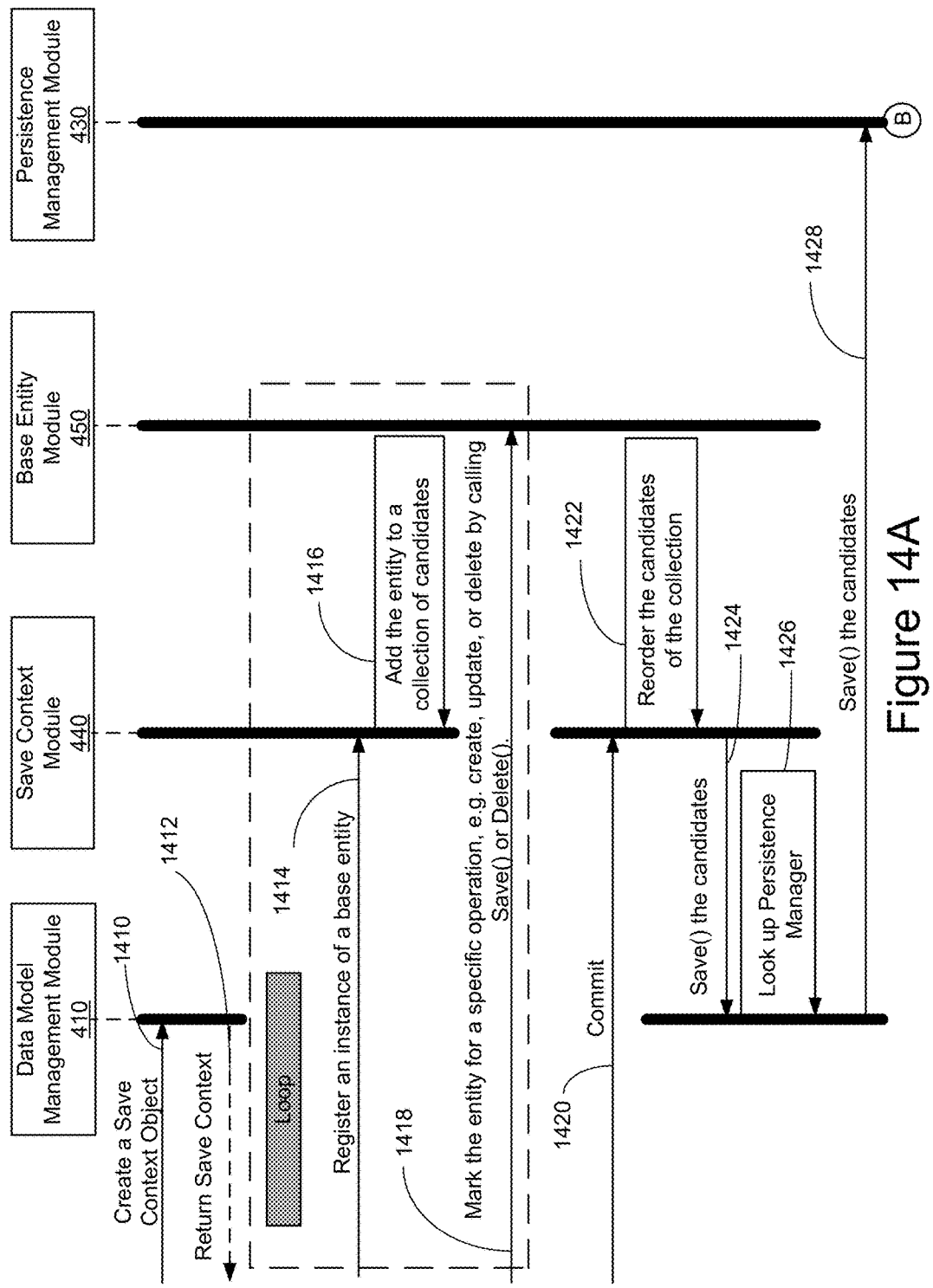
FIGS. 14A-14B are sequence diagrams for execution of a mixed mode (create, update, delete combined in a single batch) bulk save operation, according to one embodiment of the disclosed technologies.
Figure 14B:
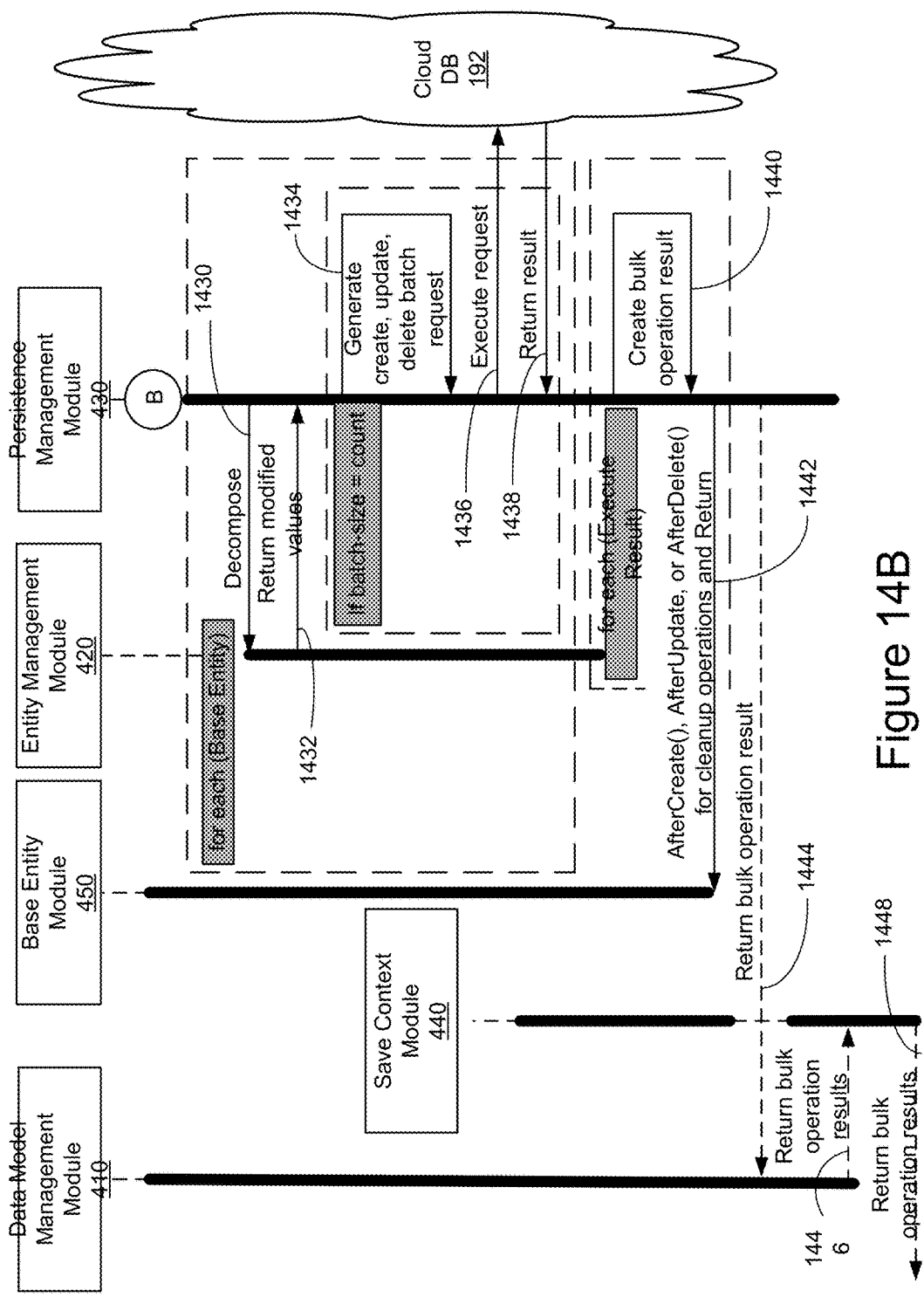

FIGS. 14A-14B are sequence diagrams for execution of a mixed mode (create, update, delete combined in a single batch) bulk save operation, according to one embodiment of the disclosed technologies. The sequence begins with a request 1410 being sent to Data Model Management Module 410 to create a save context object. Data Management module 410 returns 1412 the save context to the caller. A request 1414 to register an instance of a base entity is then sent from the caller to Save Context Module 440. In response Save Context module 440 adds 1416 the entity to a collection of candidates. A request 1418 is then sent to the Base Entity Module 450 to mark the entity for a specific operation to be performed. e.g. create, update, or delete by calling Save( ) or Delete( ). The steps of registering the entity and mark the entity for a specific operation may be repeated as needed. The caller then sends a request 1420 to Save Context Module 440 to commit the operation on the entity. At 1422, Save Context Module 440 re-orders 1422 the candidates of the collection and sends a Save( ) request 1424 to Data Model Management Module 410 to save the candidates. Data Model Management Module 410 then determines 1426 the persistence manager and sends a Save( ) request 1428 to the determined Persistence Management Module 430 to save the candidates. Persistence Management module 430 sends a request 1430 to Entity Management Module 420 to decompose each object. For each base entity, Entity Management module 420 send a request 1432 to Persistence Management Module 430 to return modified values. For any batch size that is equal to a count, Persistence Management Module 430 generates 1434 native create, update, and delete batch requests and sends a request 1436 to persistence system 192 for execution of the generated requests. Persistence system, e.g. cloud-based database 192, returns 1438 results to the Persistence Management module 430. For each result returned, Persistence Management module 430 creates 1440 a bulk operation result and sends a request 1442 for either of an AfterCreate( ), AfterUpdate( ), or AfterDelete( ) call for clean-up operations and Persistence Management System returns to Base Entity module 450. Persistence Management Module 430 further returns 1444 the result of the bulk operation to Data Model Management module 410. Data Model Management module 410 returns 1446 the bulk operation results to Save Context Module 440. Finally, Save Context Module 440 returns 1448 the bulk operation results to the caller.

The Administration (Admin) Module 150 provides user administration and authentication functionality. User information is stored in the underlying third-party application platform, i.e. persistence system 190 or 192. The Admin Module 150 includes a hidden data model definition that is not accessible outside of this module. The Admin Module 150 provides implementations for the various different authentication schemes that the development platform 108 provides.

Figure 18:
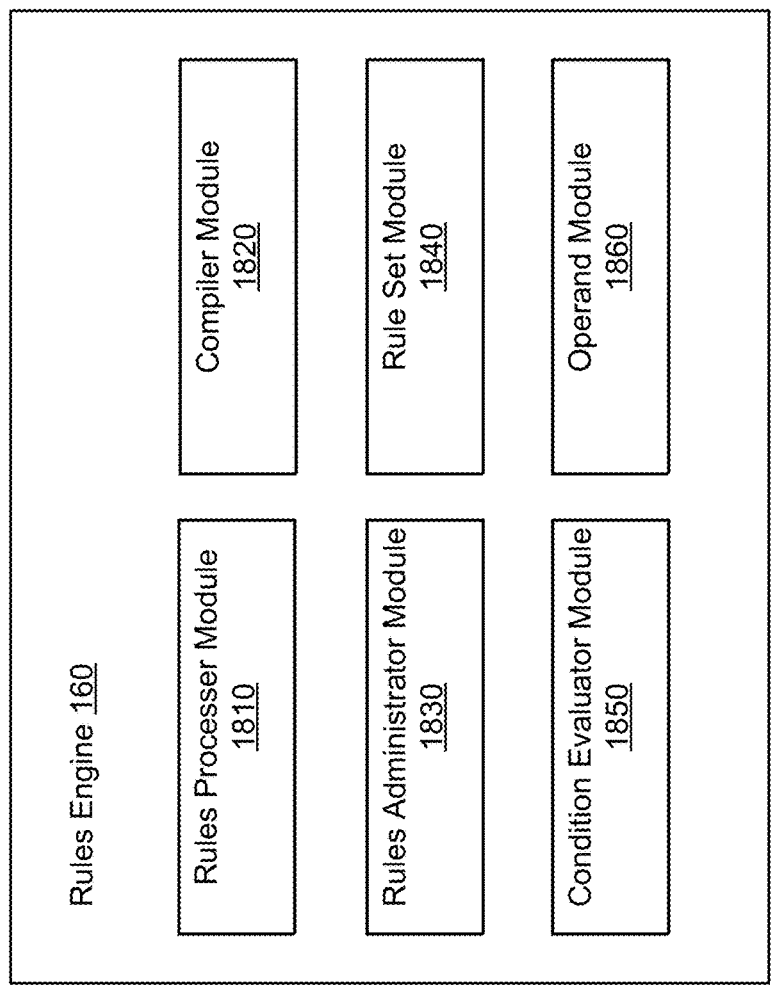
FIG. 18 is a block diagram of an embodiment of a rules engine for defining conditions that may be evaluated against objects.

FIG. 18 is a block diagram of one embodiment of a rules engine 160 for defining conditions that may be evaluated against objects. The Rules Engine Module 160 provides an API to define declarative conditions that are persistently stored via the ORM module 170. In one embodiment, these conditions may be evaluated against objects that implement a specific interface (IOperand)—also referred to herein as Operand Module 1860—and the Rules Engine Module 160 returns whether the object or set of objects pass or fail the condition. In one embodiment, conditions may be defined as a string combination of expression statements, held together by the conjunctions 'AND' and 'OR' together with braces '(' and ')' for grouping the expressions. Each expression in an expression-set associated with a condition is identified by a unique whole number. An example of a condition string with four (4) expressions would be "{1} AND ({2} OR ({3} AND {4}))". To evaluate a condition on an IOperand object, the Rules Engine 160 generates code for a class that extends a ConditionEvaluator class, also referred to herein as Condition Evaluator Module 1850, for overriding the abstract Evaluate( ) method. In the body of the method, the condition string is inserted, with the expression numbers replaced with calls to EvaluateExpression using that specific expression. This class is then compiled dynamically into native binary for fast execution, using a programmatic API into the language-specific compiler the Rules Engine module 160 is implemented in. The condition evaluators are cached for re-use.

The Rules Engine 160 includes several modules or engines for carrying out its functions, including Rules Processor module 1810, Compiler module 1820, Rules Administrator module 1830, Rule Set module 1840, Condition Evaluator module 1850, and Operand module 1860.

Rules Processor module 1810 module manages a set of conditions contained in a RuleSet. It is also the primary access point into the Rules Engine. It provides three methods:

Bool Evaluate(IOperand, Condition): returns true if the IOperand instance matches the Condition IOperand[ ] Filter(IOperand[ ], Condition): Returns the sub-set of the IOperand instances that match the Condition.

IOperand[ ] ReverseFilter(IOperand[ ], Condition): Returns the sub-set of the IOperand instances that does not match the Condition.

Compiler module 1820 is responsible for compiling the generated code into machine-executable, binary code specific to the machine platform and runtime environment the application is running in.

Rules Administrator module 1830 is responsible for validating changes made to a RuleSetModule instance (together with the RuleSet, and its constituent Condition and Expression objects). It checks for syntactic and semantic correctness and the relational integrity of a Rule Set Module instance and its constituents.

Rule Set module 1840 is the persistent representation of a RuleSet and its constituents. It comprises of a single RuleSet instance and multiple Condition and Expression instances.

Condition Evaluator module 1850 includes an abstract class ConditionEvaluator that forms the base class from which the generated Evaluator classes are generated. It provides an API to call to evaluate a Condition against an IOperand instance.

Operand module 1860 defines the API calls that must be defined by an object for the RulesEngine to be able to evaluate conditions against it.

Figure 19:
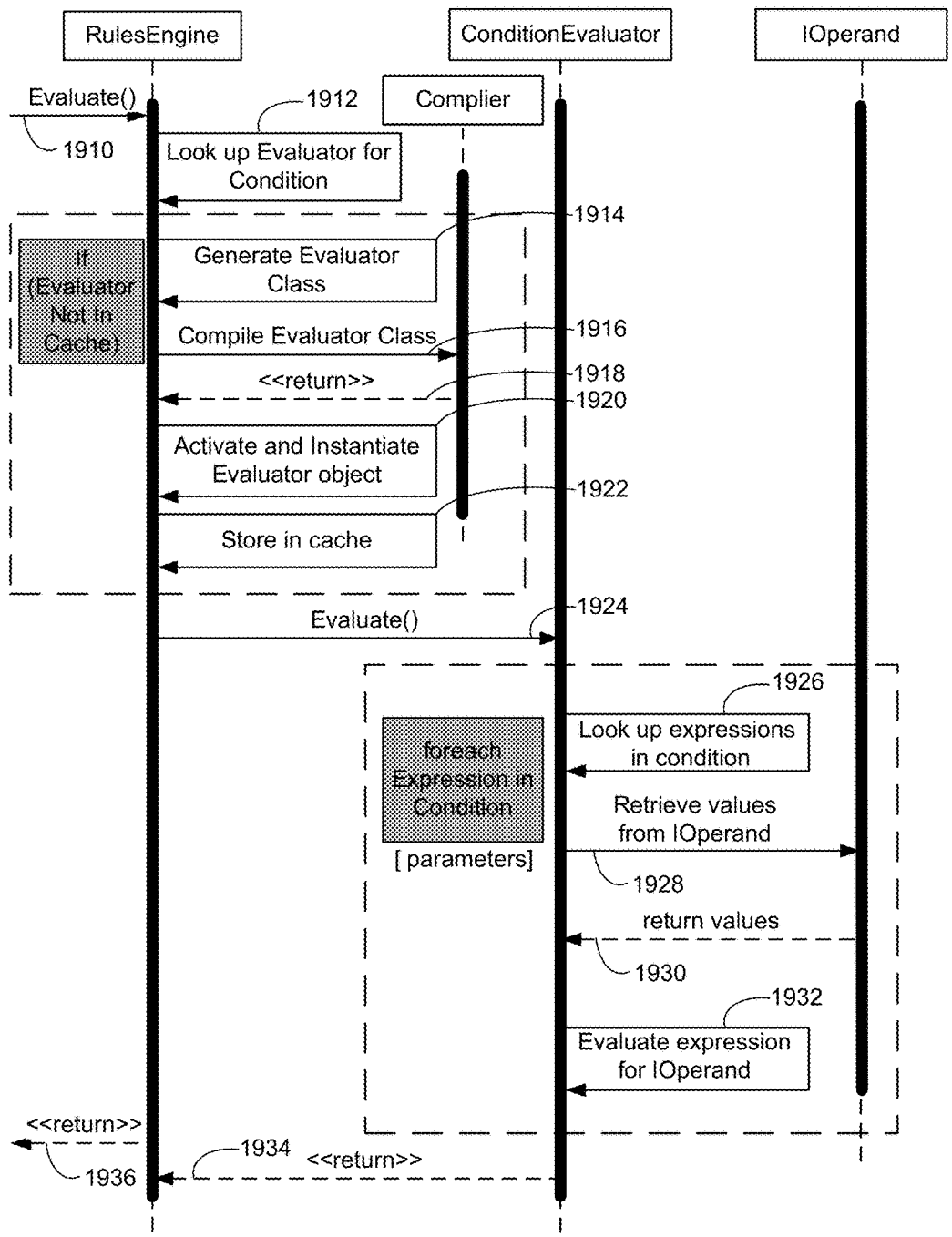
FIG. 19 is a sequence diagram for generation of condition evaluators and an evaluation of a condition, according to one embodiment of the disclosed technologies.

FIG. 19 is a sequence diagram for generation of condition evaluators and an evaluation of a condition, according to one embodiment of the disclosed technologies. The sequence 1900 may begin with Rules Processor module 1810 receiving a request 1910 to evaluate a condition against an object or set of objects that implement an interface (IOperand) to determine whether the object or set of objects pass or fail the condition. The request is passed in one (for the Evaluate( ) call) or more (For the Filter( ) and ReverseFilter( ) calls) IOperand instances. In response for the received request, the Rules Processor module 1810 will look-up 1912 or determine appropriate evaluator for the provided condition. If the Rules Processor module 1810 determines the evaluator is not in cache, the Rules Processor 1810 will proceed to generate 1914 an evaluator class for the condition. It parses the ConditionString in a Condition instance, linking the tokens in the string to the Expressions in the Condition, generating the conditional expression to evaluate the Condition based on these two sets of input. In one embodiment, the generated evaluator class may implement one abstract method which allows for parsing a condition string. The Rules Processor 1810 will then send a request to Compiler module 1820 to compile the evaluator class. The Compiler module 1820 will then return 1918 the results back to the Rules Processor 1810. The sequence may proceed with the Rules Processor 1810 activating and instantiating 1920 an evaluator object of the evaluator class that has been generated and storing 1922 the evaluator object in cache.

The sequence 1900 may then proceed with the Rules Processor 1810 sending a request 1924 to Condition Evaluator 1850 to evaluate the condition against the object that implements the interface IOperand. In this step of the sequence, the generated class is invoked to evaluate the condition against the IOperand instance. The variables in each Expression that the Condition includes are extracted from the IOperand instance via the methods that this interface provides. In response to the request, and for each expression in a condition, Condition Evaluator 1850 will look-up 1926 the expressions in the condition. Condition Evaluator 1850 may then send a request 1928 to Operand module 1850 to retrieve values from the interface IOperand. Operand module 1860 will return 1930 the requested values. Next, the Condition evaluator 1850 will evaluate 1932 the expression for IOperand. Finally, the Condition Evaluator 1850 will return 1934 the results of the evaluation to the Rules Processor 1810, and the Rules Processor 1936 will return 1936 the evaluation results of the evaluation back to the caller. For an example, consider a simple use case of checking if the name of a company is either an empty string or null. The company may be represented by an Account object, an IOperand derivative, with the name of the company stored in a field variable called CompanyName. The Account object implementation of the GetFieldValue(string fieldname) will return the company name (the value of the CompanyName field), given the value "CompanyName" for the fieldname in the call above. It will also return the string "Account" for the IOperand method call GetName( ). The Condition may have for the condition string the value "{1} or {2}". The token "{1}" represents and Expression object that has the following attributes—(Entity="Account", Field="CompanyName", Operator="Equal", Value=" ") and the token "{2}" represents and Expression object that has the following attributes—(Entity="Account", Field="CompanyName", Operator="IsNull"). Both Expression object are linked to the Condition object. When the RulesProcessorModule is sent the Account object and the Condition object in an Evaluate( ) call, it checks to see if a generated Evaluator object exists for that condition. If one is not found, an Evaluator class is generated and cached for future use (process described above). An instance of the Evaluator class is then created and the Account object passed to it. The Evaluator object then looks at the first expression represented by the token {1}, verifies that the object passed in matches the Entity value ("Account" here), retrieves the "CompanyName" value from the object via its GetFieldValue( ) method and executes the Operator on the field value thus obtained and the Value specified in the Expression object. If the expression evaluates to true, the second expression is skipped (because the conjunction in the ConditionString is "or") and a "True" result is returned. If the expression evaluates to false, the second expression is tested by the same process and the result of the test is returned.

Figure 20:
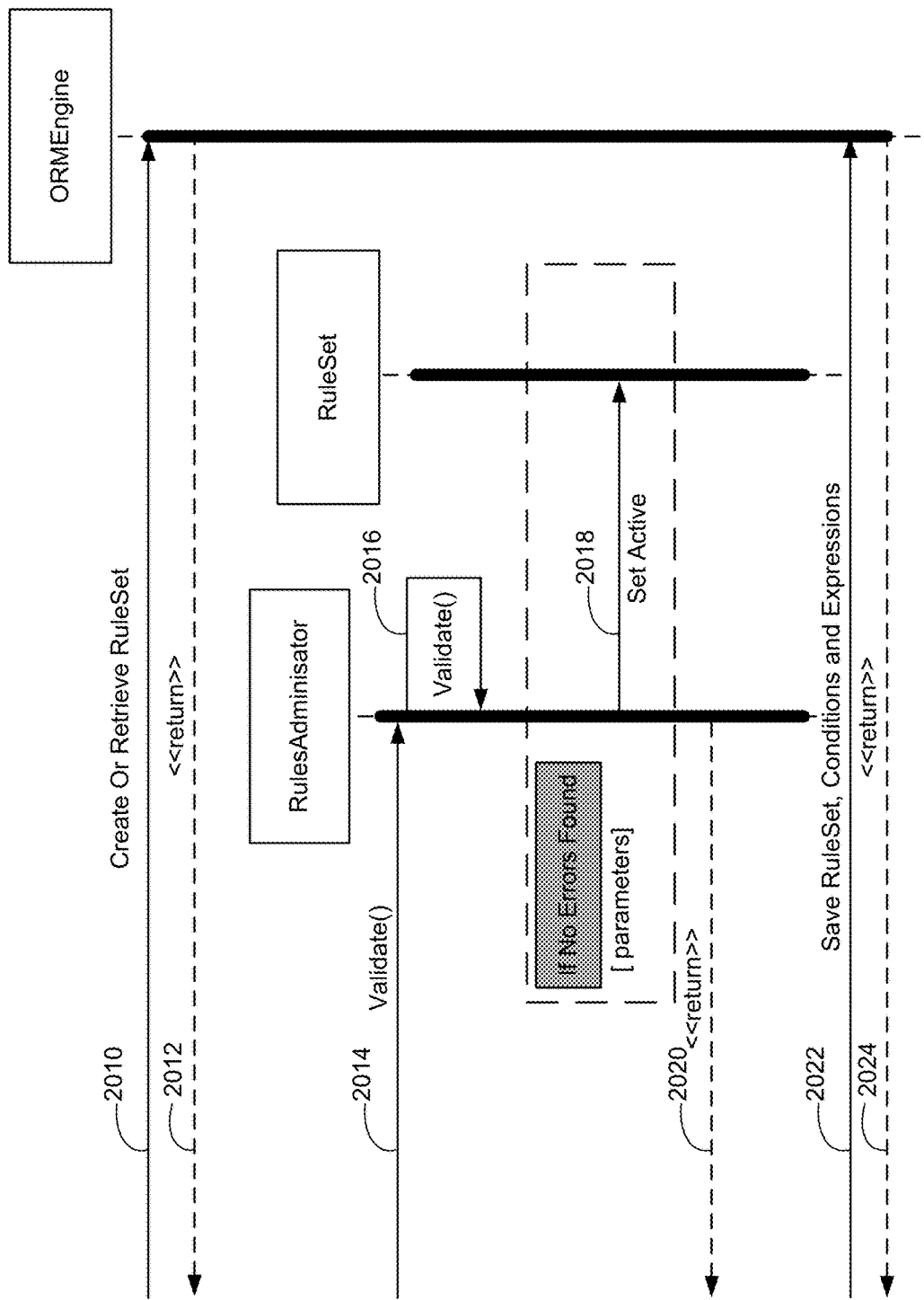
FIG. 20 is a sequence diagram for creation and retrieval of a rule set, validating a rule set and saving a rule set, according to one embodiment of the disclosed technologies.

FIG. 20 is a sequence diagram for creation and retrieval of a rule set, validating a rule set and saving a rule set. The sequence 2000 may begin with the ORM engine 170 of development platform 108 receiving a request 2010 to perform an operation pertaining to a rule set. In one embodiment, the request 2010 may include creating a rule set. In another embodiment, the request 2010 may include retrieving a rule set. ORM engine 170 returns 2012 back to the caller the results of the request including the rule set. An example of a caller is the PositiveEdge CPQ application. The use case is validation of a Quote object—an IOperand derivative—for consistency before submission. A ruleset is defined with the DataModel set to the ORMModule name that represents the data model for the application. The RootClass is set to "Quote" and a set of Conditions are defined. If the Quote object passes the validation conditions, it is submitted otherwise not. Another example could be a work-flow implementation. Conditions are defined within a RuleSet and based on which condition(s) are met by an IOperand derivative, different actions may be taken by a calling application. The sequence may proceed to validate the created or retrieved rule set where the Rules Administration module 1810 receives a request 2014 to validate the rule set. In this step, checks for syntactic and semantic correctness and the relational integrity of a Rule Set Module instance and its constituents are performed. The following checks are made, shown here with the Error number and a description of what the error entails. The tokens {n} represent identifying information for the artifact—Condition or Expression—the error is for. No token for a RuleSet object is necessary because validations are performed one ruleset at a time:

Exceptions.E901—"Name is required"
Exceptions.E902—"Data Model is required"
Exceptions.E903—"Expression {0} in condition is not defined"
Exceptions.E904—"Expression {0} has illegal combination of Aggregate and To-One relationship"
Exceptions.E905—"Expression {0} is missing required Aggregate"
Exceptions.E906—"Expression {0} has invalid relation name in field path"
Exceptions.E907—"Expression {0} has invalid field name"
Exceptions.E908—"Expression {0} field type does not match data model"
Exceptions.E909—"Root Entity is required"
Exceptions.E910—"Condition string does not have formatted expression numbers"
Exceptions.E911—"Invalid condition—unexpected conjunction"
Exceptions.E912—"Invalid condition—incomplete phrase"
Exceptions.E913—"Invalid condition—invalid conjunction or token"
Exceptions.E914—"Invalid condition—missing conjunction"
Exceptions.E915—"Invalid condition—Illegal character at {0}"
Exceptions.E916—"Invalid condition—Mismatched parenthesis"
Exceptions.E917—"Invalid condition—Incomplete syntax"
Exceptions.E918—"Data model not defined"
Exceptions.E919—"Root class does not exist"
Exceptions.E921—"Expression {0} has operator that does not match field type"
Exceptions.E922—"Expression {0} only Date types are allowed functions"
Exceptions.E923—"Expression {0} has illegal aggregate function"
Exceptions.E924—"No conditions in ruleset"
Exceptions.E926—"Field value in expression {0} does not start at root object"

If no errors are found during the validation, Rules Administrator module 1830 sends a request to the Rule Set module 1840 to set the rule set as active. In one embodiment, the Rule Set module 1840 an active RuleSet object indicates to a caller that it is safe to use—i.e. there are no current edit actions being performed on the RuleSet and its constituents and that the RuleSet and its constituents have been validated by the RulesAdministratorModule. The results 2020 are then returned back to the caller. The sequence may then proceed to send a request 2022 to the ORM engine to save the rule set and its conditions and expressions to the persistent system 190 or 192. In one embodiment, the rule set and its conditions and expressions may be saved to a cloud-based database 192. In another embodiment, the rule set and its conditions and expressions may be saved to a traditional on-premises database 190. The ORM engine returns 2024 results of the request back to the caller.

The terms "embodiment" and "implementation" are used interchangeably throughout this application to refer to one example and of the system and method of the present invention. Reference in the specification to "some implementations," "an implementation" "some embodiment," or "an embodiment" means that a particular feature, structure, or characteristic described in connection with the implementation is included in at least some instances of the description. The appearances of the phrase "in some implementations" in various places in the specification are not necessarily all referring to the same implementation.

Some portions of the detailed description are presented in terms of processes and symbolic representations of operations on data bits within a computer memory. These symbolic descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a non-transitory computer readable storage media, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementations, an entirely software implementation or implementations containing both hardware and software elements. In some implementations, the specification is implemented in software, which includes but is not limited to firmware, resident software, microcode, etc.

Furthermore, the description can take the form of a computer program product accessible from a computer-usable or computer-readable media providing program code for use by or in connection with a computer or any instruction execution system. For the purposes of this description, a computer-usable or computer readable media can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the processes and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be implemented in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system for integrating an application with a plurality of persistence systems, comprising:
    a processor; and
    a memory comprising instructions configured to cause the processor to:
        receive, from a browser of a client, a request for access to the application, the application developed for a first persistent system, the application operational on a platform, the platform providing functionality of the application to allow the application to access and operate against information on the first persistent system and simultaneously access and operate against information on a heterogeneous second persistent system;
        in response to receiving the request for access to the application, provide, to the client, instructions that when implemented cause a user interface to be dynamically generated in the browser of the client, the user interface for using the application;
        provide a data model to translate input from and output to the user interface for use by the application, the data model comprising a set of entity classes mapping to different objects, entities, or tables in different persistent systems allowing use of the application in different persistent systems by selecting an entity class that maps to an object, entity, or table in a specific persistent system;
        instantiate an entity class for the data model;
        determine, using the entity class, a manager, the manager executing operations including validating and processing the request;
        process the request using the manager to generate a native request that is executable by the second persistent system; and
        send the native request to allow the application to execute on the second persistent system.

2. The system of claim 1, wherein the first persistent system is an enterprise database and the application is an on-premises third-party application.

3. The system of claim 1, wherein the second persistent system is a cloud-based system and the application is a cloud-based third-party application.

4. The system of claim 1, wherein providing the data model comprises defining the entity class and providing a first mapping to an object of the first persistence system and a second mapping to an object of the second persistence system.

5. The system of claim 1, wherein the processor is further configured to receive a request from the user interface to perform a persistence operation against an object of the first persistence system and an object of the second persistent system.

6. The system of claim 5, wherein the persistence operation is one from the group of create, read, update, delete, bulk save, and bulk delete.

7. The system of claim 4 wherein the processor is further configured to associate the entity class with a query and the query is declarative.

8. The system of claim 7, wherein the query adheres to an agnostic schema of the first or the second persistent system.

9. The system of claim 1, wherein the data model includes an agnostic schema for the first or the second persistent system.

10. A computer-implemented method for integrating an application with a plurality of persistence systems, comprising:

receiving, from a browser of a client, a request for access to the application, the application developed for a first persistent system, the application operational on a platform, the platform providing functionality of the application to allow the application to access and operate against information on the first persistent system and simultaneously access and operate against information on a heterogeneous second persistent system;

in response to receiving the request for access to the application, providing, to the client, instructions that when implemented cause a user interface to be dynamically generated in the browser of the client, the user interface for using the application;

providing a data model to translate input from and output to the user interface for use by the application, the data model comprising a set of entity classes mapping to different objects, entities, or tables in different persistent systems allowing use of the application in different persistent systems by selecting an entity class that maps to an object, entity, or table in a specific persistent system;

instantiating an entity class for the data model;

determining, using the entity class, a manager, the manager executing operations including validating and processing the request;

processing the request using the manager to generate a native request that is executable by the second persistent system; and sending the native request to allow the application to execute on the second persistent system.

11. The method of claim 10, wherein the first persistent system is an enterprise database and the application is an on-premises third-party application.

12. The method of claim 10, wherein the second persistent system is a cloud-based system and the application is a cloud-based third-party application.

13. The method of claim 10, wherein providing the data model comprises defining the entity class and providing a first mapping to an object of the first persistence system and a second mapping to an object of the second persistence system.

14. The method of claim 10, further comprising receiving a request from the user interface to perform a persistence operation against an object of the first persistence system and an object of the second persistence system.

15. The method of claim 14, wherein the persistence operation is one from the group of create, read, update, delete, bulk save, and bulk delete.

16. The method of claim 13, further comprising associating the entity class with a query and the query is declarative.

17. The method of claim 16, wherein the query adheres to an agnostic schema of the first or the second persistent system.

18. The method of claim 10, wherein the data model includes an agnostic schema for the first or the second persistent system.

* * * * *